United States Patent
Shimada et al.

(10) Patent No.: US 12,352,908 B2
(45) Date of Patent: Jul. 8, 2025

(54) DETECTION DEVICE

(71) Applicant: DAI NIPPON PRINTING CO., LTD., Tokyo-to (JP)

(72) Inventors: Osamu Shimada, Tokyo-to (JP); Hiroki Maeda, Tokyo-to (JP); Toru Tanimori, Kyoto (JP); Atsushi Takada, Kyoto (JP); Kazuyoshi Togashi, Tokyo-to (JP); Tomohisa Motomura, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 170 days.

(21) Appl. No.: 18/029,771

(22) PCT Filed: Sep. 30, 2021

(86) PCT No.: PCT/JP2021/036348
§ 371 (c)(1),
(2) Date: Mar. 31, 2023

(87) PCT Pub. No.: WO2022/071549
PCT Pub. Date: Apr. 7, 2022

(65) Prior Publication Data
US 2023/0384465 A1    Nov. 30, 2023

(30) Foreign Application Priority Data

Oct. 1, 2020 (JP) .................... 2020-167130

(51) Int. Cl.
G01T 1/185 (2006.01)
(52) U.S. Cl.
CPC .................... G01T 1/185 (2013.01)

(58) Field of Classification Search
CPC ...................................................... G01T 1/185
See application file for complete search history.

(56) References Cited

U.S. PATENT DOCUMENTS 6,614,180 B1    9/2003   Francke et al.
2008/0251732 A1  10/2008   Dick et al.
(Continued)

FOREIGN PATENT DOCUMENTS

CN    107091851 A  *  8/2017   .......... G01N 23/203
JP    2003-536079 A    12/2003
(Continued)

OTHER PUBLICATIONS

Dec. 21, 2021 International Search Report issued in International Patent Application No. PCT/JP2021/036348.
(Continued)

Primary Examiner — David P Porta
Assistant Examiner — Fani Polyzos Boosalis
(74) Attorney, Agent, or Firm — Oliff PLC

(57) ABSTRACT

A detection device for detecting radiation includes a container including a first portion, a second portion facing the first portion in a first direction, and a side portion extending from the first portion toward the second portion, where a gas is contained in the container, an electron detector located inside the container, where the electron detector detects an electron generated by Compton scattering, a drift electrode located inside the container closer to the second portion than the electron detector and facing the electron detector, and a radiation detector located closer to the second portion than the drift electrode, where the radiation detector detects scattered radiation.

18 Claims, 29 Drawing Sheets

(56) References Cited

U.S. PATENT DOCUMENTS

| | | | |
|---|---|---|---|
| 2009/0084972 A1 | 4/2009 | Tamagawa et al. | |
| 2018/0239036 A1 | 8/2018 | Ota et al. | |

FOREIGN PATENT DOCUMENTS

| | | | | |
|---|---|---|---|---|
| JP | 2004-020249 | A | | 1/2004 |
| JP | 2007-059391 | A | | 3/2007 |
| JP | 2007-520865 | A | | 7/2007 |
| JP | 2007-234485 | A | | 9/2007 |
| JP | 2015-148448 | A | | 8/2015 |
| JP | 2015-190965 | A | | 11/2015 |
| JP | 2016-161522 | A | | 9/2016 |
| JP | 2016-217874 | A | | 12/2016 |
| JP | 2017067603 | A | * | 4/2017 |
| JP | 2019-522803 | A | | 8/2019 |
| JP | 2021-043081 | A | | 3/2021 |
| JP | 7215639 | B2 | | 1/2023 |
| WO | WO-2016140371 | A1 | * | 9/2016 |
| WO | 2017/057674 | A1 | | 4/2017 |
| WO | 2019/117147 | A1 | | 6/2019 |
| WO | 2019/147177 | A1 | | 8/2019 |
| WO | 2019/181640 | A1 | | 9/2019 |

OTHER PUBLICATIONS

Mar. 28, 2023 International Preliminary Report on Patentability issued in International Patent Application No. PCT/JP2021/036348.
Aug. 2, 2024 Office Action issued in Japanese Patent Application No. 2024-002108.
Sep. 23, 2024 Extended European Search Report issued in European Patent Application No. 21875845.6.
Jul. 21, 2023, Office Action issued in Japanese Patent Application No. 2022-198252.

\* cited by examiner

DETECTION DEVICE

TECHNICAL FIELD

Embodiments of the present disclosure relate to a detection device that detects radiation.

BACKGROUND ART

As devices for detecting radiation, detection devices for detecting Compton-scattered radiation and electrons generated by Compton scattering have been known, as disclosed in, for example, Patent literature 1 to Patent literature 3. The detection devices include a container containing a gas, a drift electrode and an electron detector facing each other inside the container, and a radiation detector located outside the container.

CITATION LIST

Patent Literature

PTL 1: International Publication No. 2017/057674 pamphlet
PTL 2: Japanese Unexamined Patent Application Publication No. 2016-217874
PTL 3: Japanese Unexamined Patent Application Publication No. 2016-161522

DISCLOSURE OF INVENTION

It is desirable to accurately acquire information about Compton scattering that occurs between a drift electrode and an electron detector. Examples of the information include the position where Compton scattering occurred, the track of a recoil electron generated by Compton scattering, and the energy of the Compton-scattered radiation. However, depending on the arrangement of the drift electrode, the electron detector, and a radiation detector, the information may not be obtained accurately.

For example, in the detection devices described in Patent literature 1 to Patent literature 3, the radiation that is Compton-scattered inside a container is incident on the radiation detector after passing through the electron detector, the container, and the air outside the container. In this case, interactions may occur between the radiation and each of the electron detector, the container, and the air outside the container. For example, the radiation may be photoelectrically absorbed, or radiation having different energy may be generated. In addition, Compton scattering may occur in the electron detector, the container, and the air outside the container. When these phenomena occur, the energy, position, or the like of the radiation detected by the radiation detector may not correspond to the Compton scattering that has occurred between the drift electrode and the electron detector. Accordingly, variations, errors, and the like are likely to occur in detection results.

The embodiments of the present disclosure provide a detection device that can effectively address such issues.

According to an embodiment of the present disclosure, a detection device for detecting radiation includes a container including a first portion, a second portion facing the first portion in a first direction, and a side portion extending from the first portion toward the second portion, where a gas is contained in the container, an electron detector located inside the container, where the electron detector detects an electron generated by Compton scattering, a drift electrode located inside the container closer to the second portion than the electron detector and facing the electron detector, and a radiation detector located closer to the second portion than the drift electrode, where the radiation detector detects scattered radiation.

In the detection device according to an embodiment of the present disclosure, the radiation detector may be located inside the container.

In the detection device according to an embodiment of the present disclosure, the radiation detector may be located outside the container.

In the detection device according to an embodiment of the present disclosure, the first portion may include an outer surface extending flatly in a range that overlaps the electron detector as viewed in a direction in which the electron detector faces the drift electrode.

In the detection device according to an embodiment of the present disclosure, the distance between an inner surface of the first portion and the electron detector may be 10 mm or less.

According to an embodiment of the present disclosure, a detection device for detecting radiation includes a container including a first portion, a second portion facing the first portion in a first direction, and a side portion extending from the first portion toward the second portion, where a gas is contained in the container, an electron detector located inside the container, where the electron detector detects an electron generated by Compton scattering, a drift electrode located inside the container closer to the first portion than the electron detector and facing the electron detector, and a radiation detector located closer to the second portion than the electron detector, where the radiation detector detects scattered radiation.

In the detection device according to an embodiment of the present disclosure, the radiation detector may be located inside the container.

In the detection device according to an embodiment of the present disclosure, the radiation detector may be located outside the container.

In the detection device according to an embodiment of the present disclosure, the first portion may include an outer surface extending flatly in a range that overlaps the drift electrode as viewed in a direction in which the electron detector faces the drift electrode.

In the detection device according to an embodiment of the present disclosure, the distance between the inner surface of the first portion and the drift electrode may be 10 mm or greater and 100 mm or less.

In the detection device according to an embodiment of the present disclosure, the drift electrode may include a plurality of through-holes.

According to an embodiment of the present disclosure, a detection device for detecting radiation includes a container including a first portion, a second portion facing the first portion in a first direction, and a side portion extending from the first portion toward the second portion, where a gas is contained in the container, an electron detector located inside the container, where the electron detector detects an electron generated by Compton scattering, a drift electrode located inside the container and facing the electron detector in a direction crossing the first direction, and a radiation detector located closer to the second portion than to the first portion, where the radiation detector detects scattered radiation.

In the detection device according to an embodiment of the present disclosure, the radiation detector may be located inside the container.

In the detection device according to an embodiment of the present disclosure, the radiation detector may be located outside the container.

A detection device according to an embodiment of the present disclosure may further include an electron amplifier located between the electron detector and the drift electrode and facing the electron detector and the drift electrode.

In the detection device according to an embodiment of the present disclosure, the electron detector may include a plurality of collector electrodes. The electron amplifier may include a base material having a front surface and a back surface and having a through-hole formed to overlap the collector electrode in a direction facing the drift electrode, a first electrode located on the front surface, and a second electrode located on the back surface.

The detection device according to an embodiment of the present disclosure may further include an auxiliary drift electrode including a plurality of ring electrodes arranged in a direction in which the electron detector faces the drift electrode, and a spacer located between adjacent two of the ring electrodes.

The detection device according to an embodiment of the present disclosure may include an auxiliary drift electrode including a plurality of ring electrodes arranged in a direction in which the electron detector faces the drift electrode and a spacer located between adjacent two of the ring electrodes and a relay board configured to support the auxiliary drift electrode and the electron detector. The drift electrode may be attached to the auxiliary drift electrode and faces the electron detector. The relay board may be disposed on the second portion.

In the detection device according to an embodiment of the present disclosure, the radiation detector may include a scintillator configured to be excited by the scattered radiation and emit fluorescence and a light detector configured to detect the fluorescence.

In the detection device according to an embodiment of the present disclosure, the radiation detector may include a semiconductor detection element configured to detect the scattered radiation.

In the detection device according to an embodiment of the present disclosure, the side portion of the container may have a cylindrical shape.

The detection device according to an embodiment of the present disclosure may further include an adsorbent located inside the container.

The detection device according to an embodiment of the present disclosure may further include a circulation path connected to the container, and a pump and a filter inserted into the circulation path.

According to the embodiments of the present disclosure, it is possible to improve the detection accuracy of the radiation detector.

DESCRIPTION OF EMBODIMENTS

Figure 1:
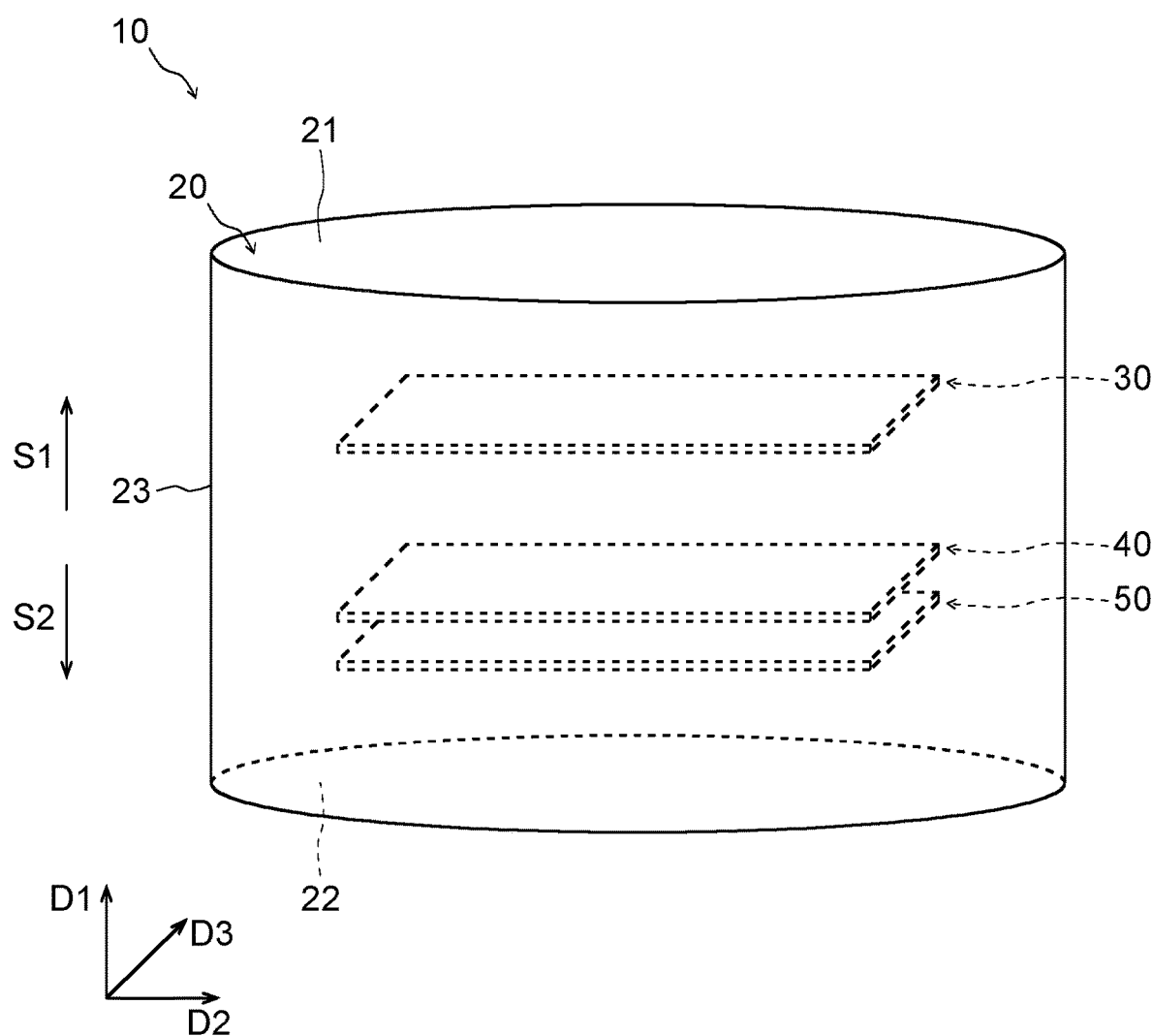
FIG. 1 is a perspective view of an example of a detection device according to a first embodiment.

The embodiments described below are examples of embodiments of the present disclosure, and the present disclosure should not be construed as being limited to the embodiments. In addition, the terms such as "substrate", "base material", "sheet" and "film" as used herein should not be distinguished from one another only by their names. For example, the terms "substrate" and "base material" are a concept that include members that can be called a "sheet" and a "film". Furthermore, the terms used herein to specify a shape, geometric conditions and their degrees, such as "parallel" and "perpendicular", and length, angle value, and the like are not strictly defined and are considered to be within the range to provide a similar expected function.

In the drawings referred to herein, the same or similar reference signs may be used to identify the same parts or parts having similar functions, and redundant description of the parts may be omitted. In addition, the dimensional ratios in the drawings may differ from the actual ratios for convenience of explanation, and part of the configuration may be removed from the drawings.

In the present specification, when a plurality of candidates of the upper limit value and a plurality of candidates of the lower limit value are given for a parameter, the numerical range of the parameter may be defined by a combination of any one of the candidates of the upper limit value and any one of the candidates of the lower limit value. For example, in the case where description "a parameter B may be, for example, A1 or greater, A2 or greater, or A3 or greater" and description "the parameter B may be, for example, A4 or less, A5 or less, or A6 or less" are given, the numerical range of the parameter B may be A1 or greater and A4 or less, A1 or greater and A5 or less, A1 or greater and A6 or less, A2 or greater and A4 or less, A2 or greater and A5 or less, A2 or greater and A6 or less, A3 or greater and A4 or less, A3 or greater and A5 or less, or A3 or greater and A6 or less.

First Embodiment

Figure 2:
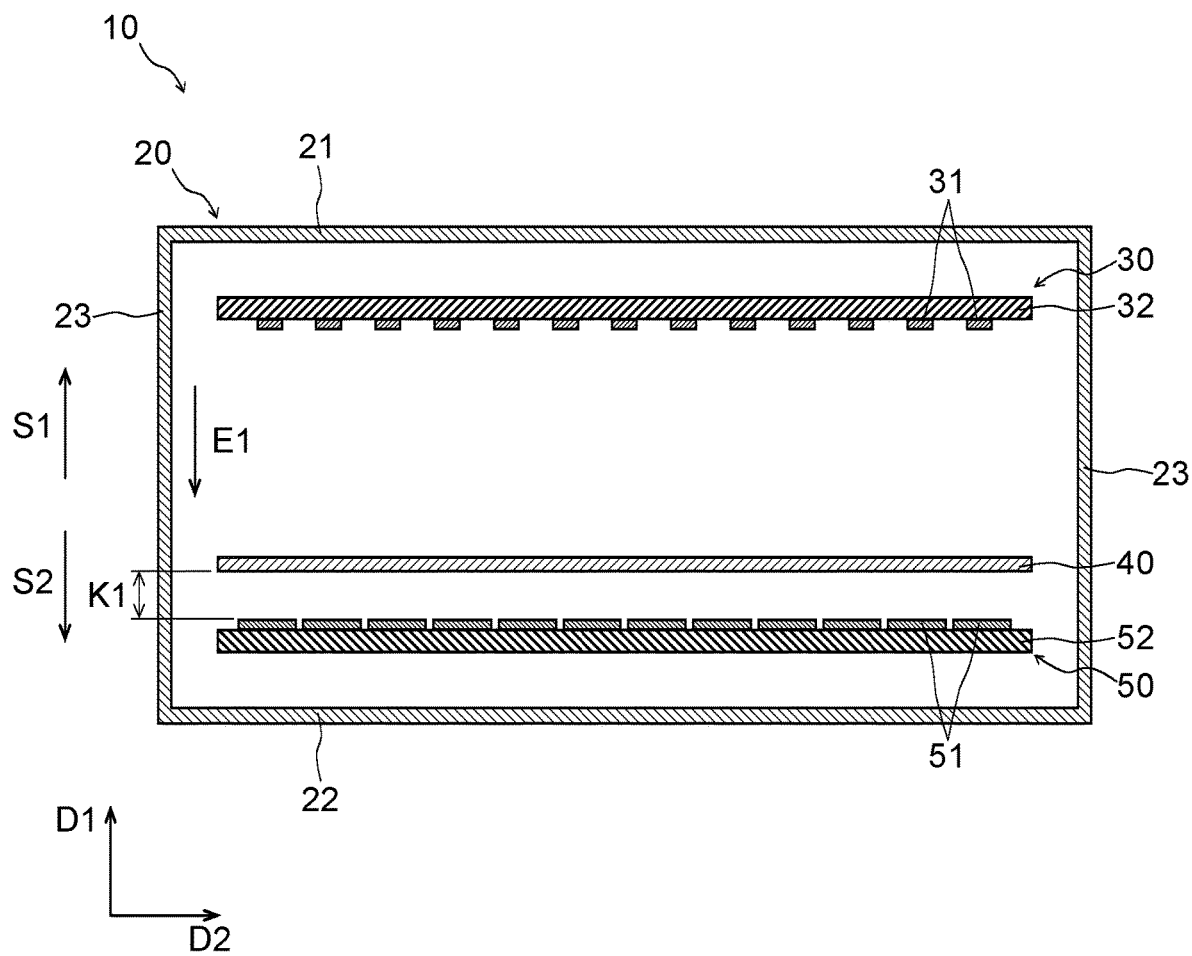
FIG. 2 is a sectional view of the detection device illustrated in FIG. 1.

The configuration of a detection device 10 according to the first embodiment of the present disclosure is described in detail below with reference to the accompanying drawings. The overview of the detection device 10 is first described. FIG. 1 is a perspective view of an example of the detection device 10. FIG. 2 is a sectional view of the detection device 10 illustrated in FIG. 1.

(Detection Device)

The detection device 10 includes a container 20 and an electron detector 30, a drift electrode 40, and a radiation detector 50 located inside the container 20. The container 20 is, for example, a chamber. At least a rare gas, such as argon or xenon, is contained inside the container 20. In addition to the rare gas, the container 20 may contain quenching gas, such as carbon dioxide or methane, which has a quenching effect.

The container 20 includes a first surface 21, a second surface 22 facing the first surface 21 in a first direction D1, and a side surface 23 extending from the first surface 21 to the second surface 22. The detection device 10 is designed to detect radiation incident on the inside of the container 20 through the first surface 21. The container 20 may be placed such that the second surface 22 faces or touches a surface, such as a surface of a floor or a table. As illustrated in FIG. 1, the container 20 may have a cylindrical shape. That is, the side surface 23 may have a circular cross-section. Although not illustrated, the container 20 may have a shape other than a cylindrical shape, such as a cubic or cuboid shape. Although not illustrated, the first surface 21 may be curved so as to be convex toward the outside of the container 20.

A physical object that emits radiation is located outside the container 20. The first surface 21 is the surface of the container that is the closest to the physical object among the surfaces of the container. In the description below, the first surface 21 is also referred to as a first portion 21. The second surface 22 is also referred to as a second portion 22. The side surface 23 is also referred to as a side portion 23.

It is desirable that the material of the container 20 be one that allows radiation to easily pass therethrough. Thus, radiation can be suppressed from being absorbed or scattered by the container 20 while passing through the container 20. The material of the container 20 may contain plastic or metal, for example. The plastic may be fiber reinforced plastic. When using a metal, the container 20 may be composed of a single metal element or may be composed of an alloy. As the metal, for example, aluminum or an aluminum alloy can be used. A metal having a specific gravity of less than 4 may be used to reduce the weight of the container 20.

When the material of the container 20 contains plastic, the thickness of the container 20 is, for example, 1 mm or greater, may be 5 mm or greater, or may be 10 mm or greater. The thickness of the container 20 is, for example, 30 mm or less, may be 25 mm or less, or may be 20 mm or less.

When the material of the container 20 contains metal, the thickness of the container 20 is, for example, 2 mm or greater, may be 3 mm or greater, or may be 5 mm or greater. The thickness of the container 20 is, for example, 20 mm or less, may be 15 mm or less, or may be 10 mm or less.

The electron detector 30, the drift electrode 40, and the radiation detector 50 are arranged in this order from the first portion 21 to the second portion 22. That is, the drift electrode 40 is located closer to the second portion 22 than the electron detector 30. The radiation detector 50 is located closer to the second portion 22 than the drift electrode 40. The phrase "The constituent element A is located closer to the second portion 22 than the constituent element B" means that the constituent element A is located on the side indicated by an arrow S2 in FIG. 1 with respect to the constituent element B. The arrow S2 represents the direction from the first portion 21 to the second portion 22. The distance from the constituent element B to the second portion 22 may be greater or less than the distance from the constituent element B to constituent element A.

The electron detector 30 may be closer to the first portion 21 than to the second portion 22. The drift electrode 40 and the radiation detector 50 may be closer to second portion 22 than to first portion 21.

The electron detector 30, the drift electrode 40, and the radiation detector 50 are described in detail below.

If the radiation incident on the inside of the container 20 collides with the gas, Compton scattering may occur. When Compton scattering occurs, recoil electrons are generated. In addition, ionized electrons are generated along the tracks of the recoil electrons. The electron detector 30 detects the ionized electrons. By detecting the ionized electrons, the track and energy of the recoil electrons can be calculated.

Figure 3:
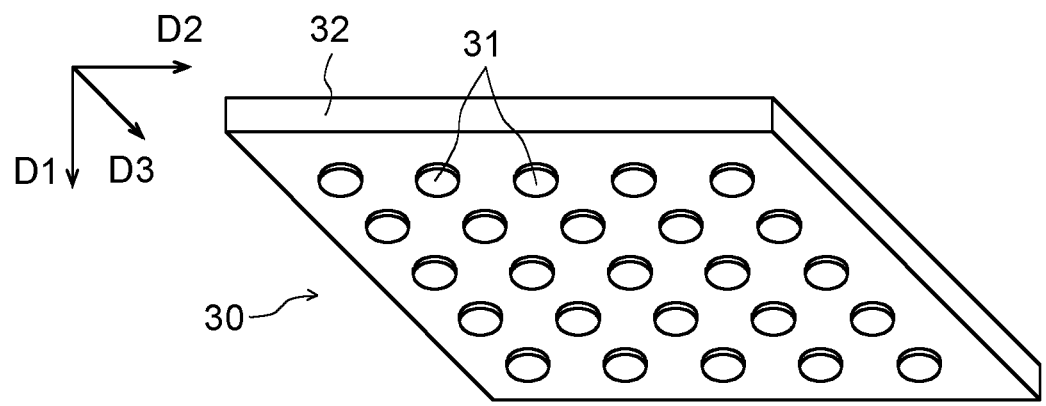
FIG. 3 is a perspective view of an example of an electron detector.

FIG. 3 is a perspective view of an example of the electron detector 30. The electron detector 30 may include a plurality of collector electrodes 31 and a support substrate 32 that supports the collector electrodes 31. Each of the collector electrodes 31 faces the drift electrode 40. The support substrate 32 includes a surface extending in a direction crossing the first direction D1. The collector electrode 31 detects ionized electrons attracted to the electron detector 30 by the electric field. The plurality of collector electrodes 31 may be arranged in a direction crossing the first direction D1. For example, the support substrate 32 may include a surface extending in a direction perpendicular to the first direction D1. The plurality of collector electrodes 31 may be arranged in a second direction D2 and a third direction D3 each perpendicular to the first direction D1. The second direction D2 and the third direction D3 may be perpendicular to each other.

The collector electrode 31 contains a material having electrical conductivity. Examples of the material for the collector electrode 31 include copper (Cu), gold (Au), silver (Ag), platinum (Pt), palladium (Pd), rhodium (Rh), tin (Sn), aluminum (Al), nickel (Ni), chromium (Cr), titanium (Ti), molybdenum (Mo), tungsten (W), tantalum (Ta), and an alloy using these metals. Metal having high electrical conductivity, such as copper (Cu), gold (Au), or silver (Ag), is preferably used.

The electrons detected by the collector electrode 31 are processed as electrical signals. The electron detector 30 may include circuitry, wiring, and the like for processing the electrical signals. The electrical signal may be transmitted to the outside of the container 20 via, for example, a cable, a hermetic connector, a wiring board, or the like (none is illustrated) connected to the electron detector 30.

Although not illustrated, a plurality of electron detectors 30 may be arranged in the second direction D2 or the third direction D3. This makes it possible to expand the area in which an electron can be detected.

The drift electrode 40 is disposed to face the electron detector 30. For example, the drift electrode 40 faces the electron detector 30 in the first direction D1. That is, the drift electrode 40 includes a surface extending in a direction perpendicular to the first direction D1. The drift electrode 40 has a potential lower than the potential of the collector electrode 31 of the electron detector 30. Accordingly, an electric field E1 is generated between the electron detector 30 and the drift electrode 40. The electric field E1 comes from the electron detector 30 toward the drift electrode 40, as illustrated in FIG. 2. Ionized electrons caused by recoil electrons generated by Compton scattering are attracted toward the electron detector 30 by the electric field E1.

The drift electrode 40 contains a material having electrical conductivity. For example, the drift electrode 40 contains a metal with a specific gravity of less than 4, such as aluminum or aluminum alloys. As a result, the radiation passing through the drift electrode 40 can be less affected by the drift electrode 40 than when the drift electrode 40 contains a metal with a high specific gravity.

The thickness of the drift electrode 40 is, for example, 0.01 mm or greater. The thickness may be 0.1 mm or greater or may be 0.3 mm or greater. The thickness of the drift electrode 40 is, for example, 2.0 mm or less. The thickness may be 1.0 mm or less or may be 0.5 mm or less. The radiation passing through the drift electrode 40 can be less affected by the drift electrode 40 with decreasing thickness of the drift electrode 40.

The radiation detector 50 detects scattered radiation. According to the present embodiment, radiation scattered between the electron detector 30 and the drift electrode 40 is detected by radiation detector 50 after passing through the drift electrode 40. The radiation detector 50 can detect the position and energy of the radiation that reaches the radiation detector 50.

Figure 4:
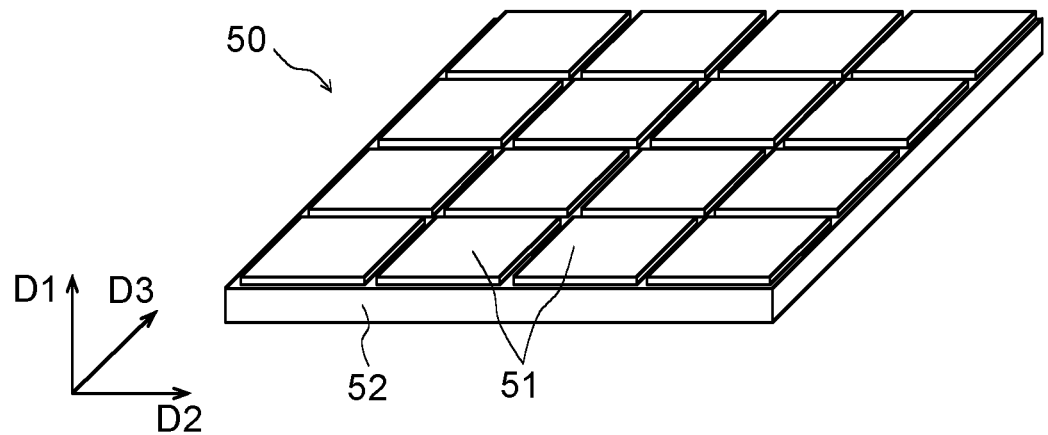
FIG. 4 is a perspective view of an example of a radiation detector.

FIG. 4 is a perspective view of an example of the radiation detector 50. The radiation detector 50 may include a plurality of detection elements 51 and a circuit board 52 that supports the detection elements 51. The plurality of detection elements 51 may be arranged in a direction crossing the first direction D1. For example, the plurality of detection elements 51 may be arranged in the second direction D2 and the third direction D3 each perpendicular to the first direction D1.

Any configuration of the detection element 51 can be employed as long as the detection element 51 can detect radiation.

For example, the detection element 51 may include a scintillator that emits fluorescence when excited by scattered radiation and a light detector that detects the fluorescence. The light detector may include, for example, an avalanche photodiode.

The detection element 51 may include a semiconductor detection element that detects the scattered radiation. The semiconductor detection element may include, for example, a semiconductor that contains zinc cadmium telluride.

The radiation detector 50 may include a first detection element 51 capable of detecting radiation having energy within a first range and a second detection element 51 capable of detecting radiation having energy within a second range different from the first range. This configuration can expand the radiation energy range that can be detected by the radiation detector 50.

The radiation detected by the detection element 51 is processed as an electronic signal by the circuit board 52. The circuit board 52 may include circuitry, wiring, and the like for processing the electrical signals. The electrical signal may be transmitted to the outside of the container 20 via, for example, a cable, a hermetic connector, a wiring board, or the like (none is illustrated) connected to the circuit board 52.

The radiation detector 50 is electrically insulated from the drift electrode 40. For example, a distance K1 between the radiation detector 50 and the drift electrode 40 is set so as to ensure electrical insulation. A gas, an insulator, or the like may be located between the drift electrode 40 and the radiation detector 50. This configuration can reduce the occurrence of a defect, such as discharge between the drift electrode 40 and the radiation detector 50.

Although not illustrated, a plurality of radiation detectors 50 may be arranged in the second direction D2 or the third direction D3. This configuration can expand the area in which radiation can be detected.

It is desirable that the electrical components located inside the container 20, such as the electron detector 30, the drift electrode 40, and the radiation detector 50, be arranged so that defects, such as discharge between each of the electrical components and the inner surface of the container 20, do not occur. For example, it is desirable that the arrangement and the potentials of the electrical components be determined such that the electric field generated between each of the electrical components located inside the container 20 and the inner surface of the container 20 is 2.5 kV/cm or lower.

(Method for Manufacturing Detection Device)

An example of the method for manufacturing the detection device 10 is described below.

Electrical components, such as the electron detector 30, the drift electrode 40, the radiation detector 50, cables, and connectors, are prepared first that are to be disposed inside the container 20. Subsequently, the electrical components are subjected to a first reduced-pressure baking treatment. For example, the inside of a container used in the treatment is controlled to have a pressure atmosphere lower than the atmospheric pressure, and the electrical components are heated inside the container. In this way, it is possible to reduce the occurrence of outgassing from the electrical components during use of the detection device 10. The pressure of the atmosphere is, for example, 0.1 atm or lower. During the reduced-pressure baking treatment, the pressure may be maintained at 0.1 atm or lower by evacuating gas from the inside of the container. The heating temperature is, for example, 60° C. or higher. The heating temperature may be 100° C. or higher. The heating temperature may be 125° C. or lower. The heating time may be 2 hours or longer or may be 12 hours or longer. Similarly, the container 20 of the detection device 10 may be subjected to the first reduced-pressure baking treatment.

Subsequently, the electrical components that have been subjected to the first reduced-pressure baking treatment are disposed inside the container 20. Thereafter, the electrical components may be subjected to a second reduced-pressure baking treatment inside the container 20.

It is desirable to employ electrical components, such as the electron detector 30, the drift electrode 40, the radiation detector 50, cables, and connectors, that are less likely to produce outgassing. For example, a component having a hollow portion, such as an aluminum electrolytic capacitor, is likely to produce outgassing. Considering this fact, it is desirable to employ a laminated ceramic capacitor instead of an aluminum electrolytic capacitor.

(Operation Performed by Detection Device)

Figure 5:
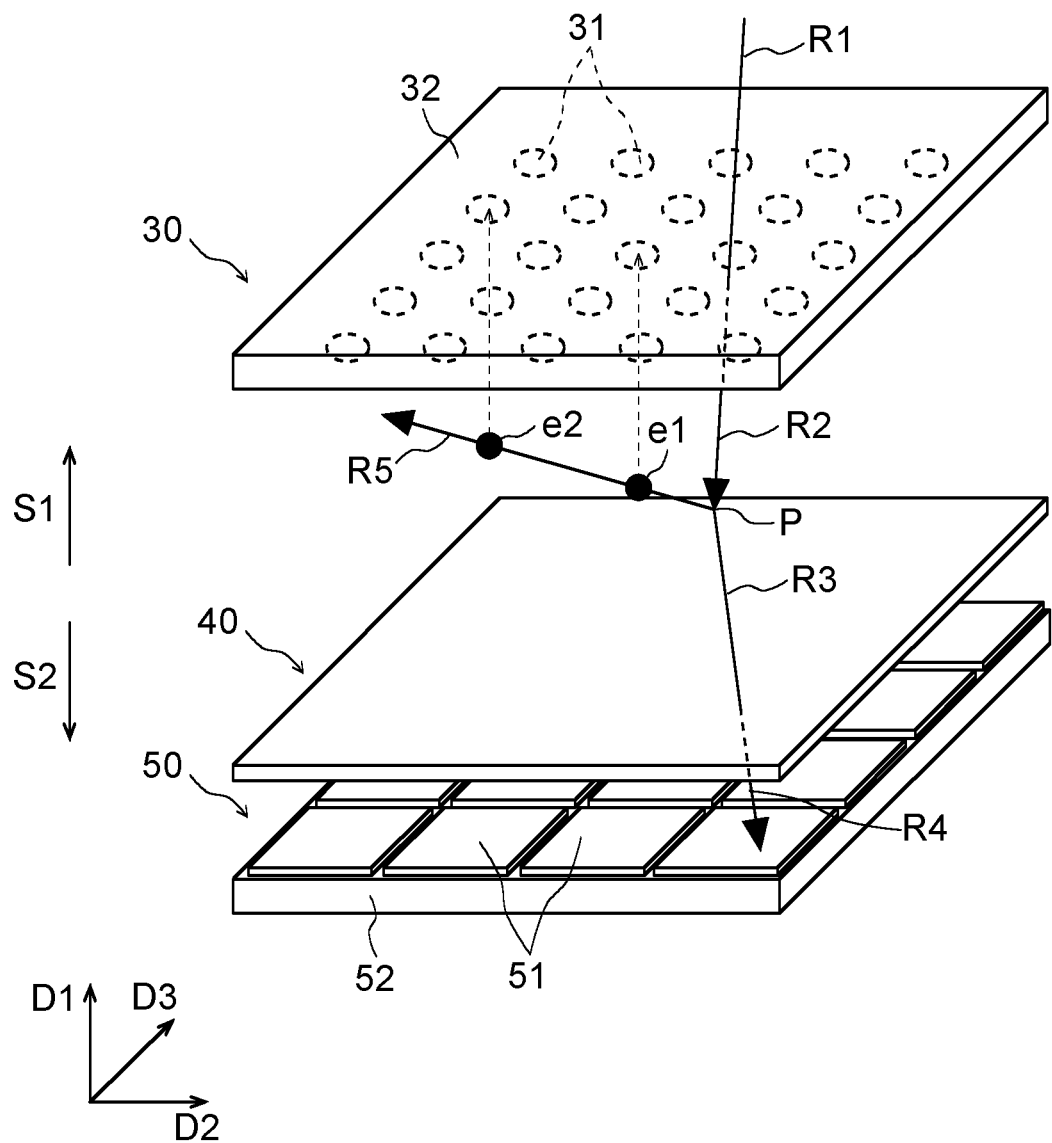
FIG. 5 is an explanatory diagram of the operation performed by the detection device illustrated in FIG. 1.

An example of the operation performed by the detection device 10 is described below with reference to FIG. 5. In FIG. 5, the container 20 is not illustrated.

In FIG. 5, reference sign R1 represents radiation that has passed through the first portion 21 of the container 20 and is incident on the inside of the container 20. The radiation R1 is, for example, a charged particle, a gamma ray, an X-ray, a neutron, or ultraviolet light. After passing through the electron detector 30, the radiation R1 reaches the space between the electron detector 30 and the drift electrode 40. Reference sign R2 represents radiation that has reached the space between the electron detector 30 and the drift electrode 40. The energy of radiation R2 may be lower than the energy of radiation R1 due to scattering and attenuation that occurs when the radiation R2 passes through the electron detector 30.

Compton scattering may occur when the radiation R2 collides with gas. Reference sign P represents the position where the scattering occurred. The position P is also referred to as a "scattered point". Reference sign R3 represents scattered radiation. The radiation R3 reaches the radiation detector 50 after passing through the drift electrode 40. Reference sign R4 represents radiation that has reached the radiation detector 50. The energy of the radiation R4 may be lower than the energy of the radiation R3 due to scattering and attenuation that occurs when the radiation R3 passes through the drift electrode 40. The radiation R4 is detected by one of the plurality of detection elements 51. Thus, the reaching position and the energy of the radiation R4 can be calculated.

Reference sign R5 represents a recoil electron generated by Compton scattering. An electron cloud is formed along the track of the recoil electron R5. Each of electrons in the electron cloud is attracted toward the electron detector 30 by the electric field E1. For example, as illustrated in FIG. 5, electrons e1 and e2 sequentially generated along the track of the recoil electron R5 are attracted toward the electron detector 30. The electrons e1 and e2 are detected by the respective collector electrodes 31 corresponding to the positions of the electrons e1 and e2. Thus, the positions and energies of the electrons e1 and e2 can be calculated. In addition, the track and energy of the recoil electron R5 and the scattered point P can be calculated.

According to the present embodiment, the radiation detector 50 is located inside the container 20, as described above. Therefore, it is possible to reduce the occurrence of scattering, attenuation, and the like of radiation before the radiation reaches the radiation detector 50, as compared with the case where the radiation detector 50 is located outside the container 20. Accordingly, information regarding the radiation R3 scattered in the space between the electron detector 30 and the drift electrode 40 can be obtained more accurately.

In addition, according to the present embodiment, the radiation detector 50 faces the drift electrode 40. When the thickness of the drift electrode 40 is small and the specific gravity of the metal forming the drift electrode 40 is small, the radiation passing through the drift electrode 40 is less likely to be affected by the drift electrode 40. This also contributes to reducing the difference between the energy of the radiation R4 that reaches the radiation detector 50 and the energy of the scattered radiation R3. Moreover, this can contribute to reducing the difference between the radiation dose of the radiation R4 that reaches the radiation detector 50 and the radiation dose of the scattered radiation R3. Consequently, the information regarding the scattered radiation R3 can be obtained more accurately.

The present embodiment is particularly useful when the energies of the radiation R1 and R2 before being scattered are unknown.

Various modifications can be made to the first embodiment described above. Modifications are described below with reference to the accompanying drawings as necessary. In the following description and the drawings used in the description, parts configured similarly to those according to the first embodiment are identified by the same reference signs as those used for the corresponding parts according to the first embodiment, and redundant description is omitted. Furthermore, when it is clear that the operation and effect obtained in the first embodiment can be obtained in the modification, description of the operation and effect may be omitted.

First Modification

Figure 6:
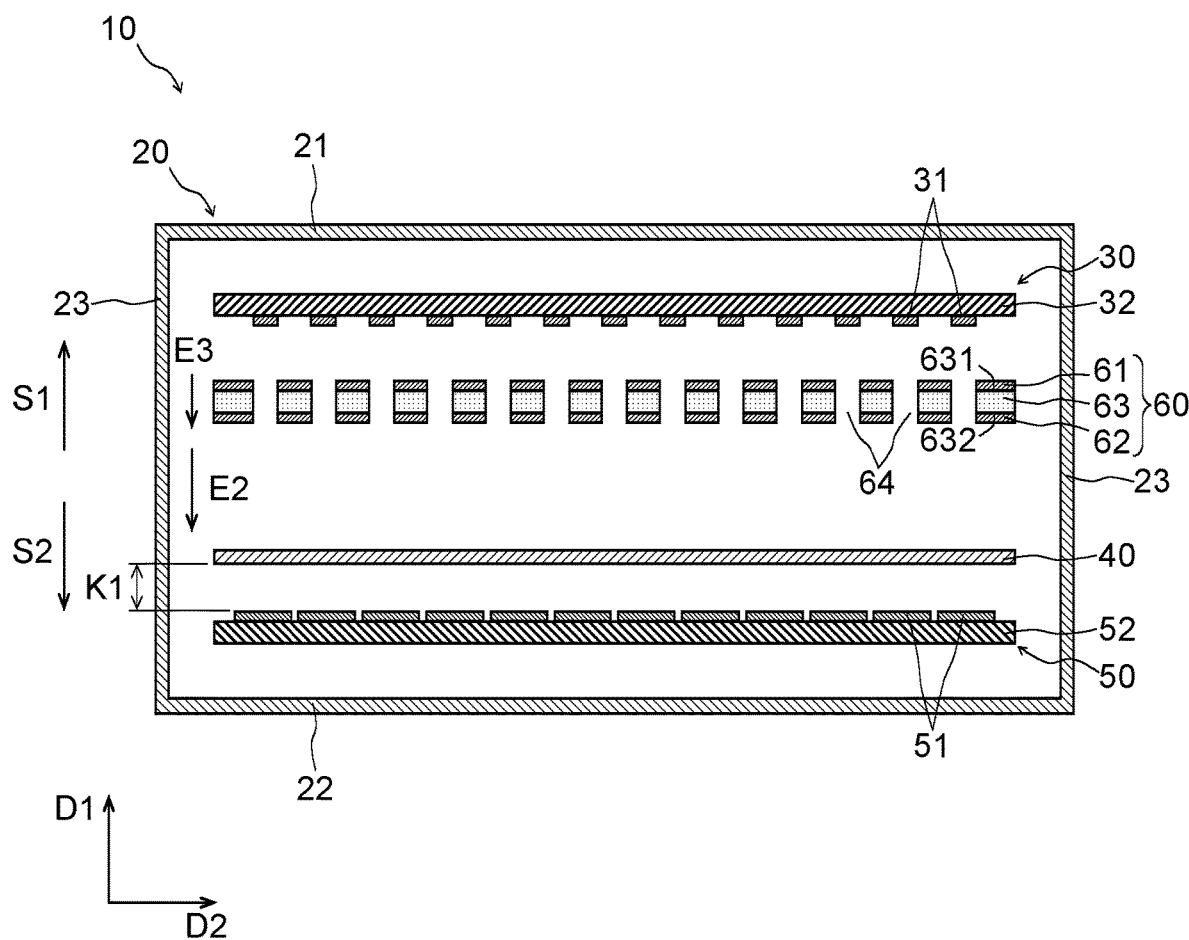
FIG. 6 is a sectional view of a first modification of the detection device according to the first embodiment.

FIG. 6 is a sectional view of a detection device 10 according to the first modification. The detection device 10 may include an electron amplifier 60 located between the electron detector 30 and the drift electrode 40. For example, the electron amplifier 60 is disposed to face the electron detector 30 and the drift electrode 40 in the first direction D1.

The electron amplifier 60 is configured to cause electron avalanche amplification to occur. For example, the electron amplifier 60 includes a base material 63 including a front surface 631 and a back surface 632, a first electrode 61 located on the front surface 631 and a second electrode 62 located on the back surface 632. The first electrode 61 faces the electron detector 30. The second electrode 62 faces the drift electrode 40. A plurality of through-holes 64 are formed in the base material 63 to pass through the base material 63 from the front surface 631 to the back surface 632. As illustrated in FIG. 6, each of the through-holes 64 overlaps one of the collector electrodes 31 of the electron detector 30 in a direction facing the drift electrode 40, for example, in the first direction D1. A plurality of collector electrodes 31 may overlap one of the through-holes 64.

The potential of the second electrode 62 is higher than the potential of the drift electrode 40. Therefore, an electric field E2 directed from the second electrode 62 toward the drift electrode 40 is generated between the second electrode 62 and the drift electrode 40. The potential of the first electrode 61 is higher than the potential of the second electrode 62. Therefore, an electric field E3 directed from the first electrode 61 to the second electrode 62 is generated between the first electrode 61 and the second electrode 62.

The case is discussed below where Compton scattering of radiation incident from the first portion 21 on the inside of the container 20 occurs between the electron amplifier 60 and the drift electrode 40. The electrons in the electron cloud formed along the track of the recoil electron are attracted toward the electron amplifier 60 by the electric field E2.

The electrons attracted by the electron amplifier 60 collide with the gas and ionize the gas. The ionized electrons are attracted toward the first electrode 61 as an electron group while being amplified in an avalanche manner inside the through-hole 64. The electrons passing through the through-holes 64 are detected by the collector electrodes 31. According to the present modification, the number of electrons to be measured is increased by using the electron amplifier 60. Therefore, the positions of electrons and the like can be detected with higher accuracy.

Second Modification

Figure 7:
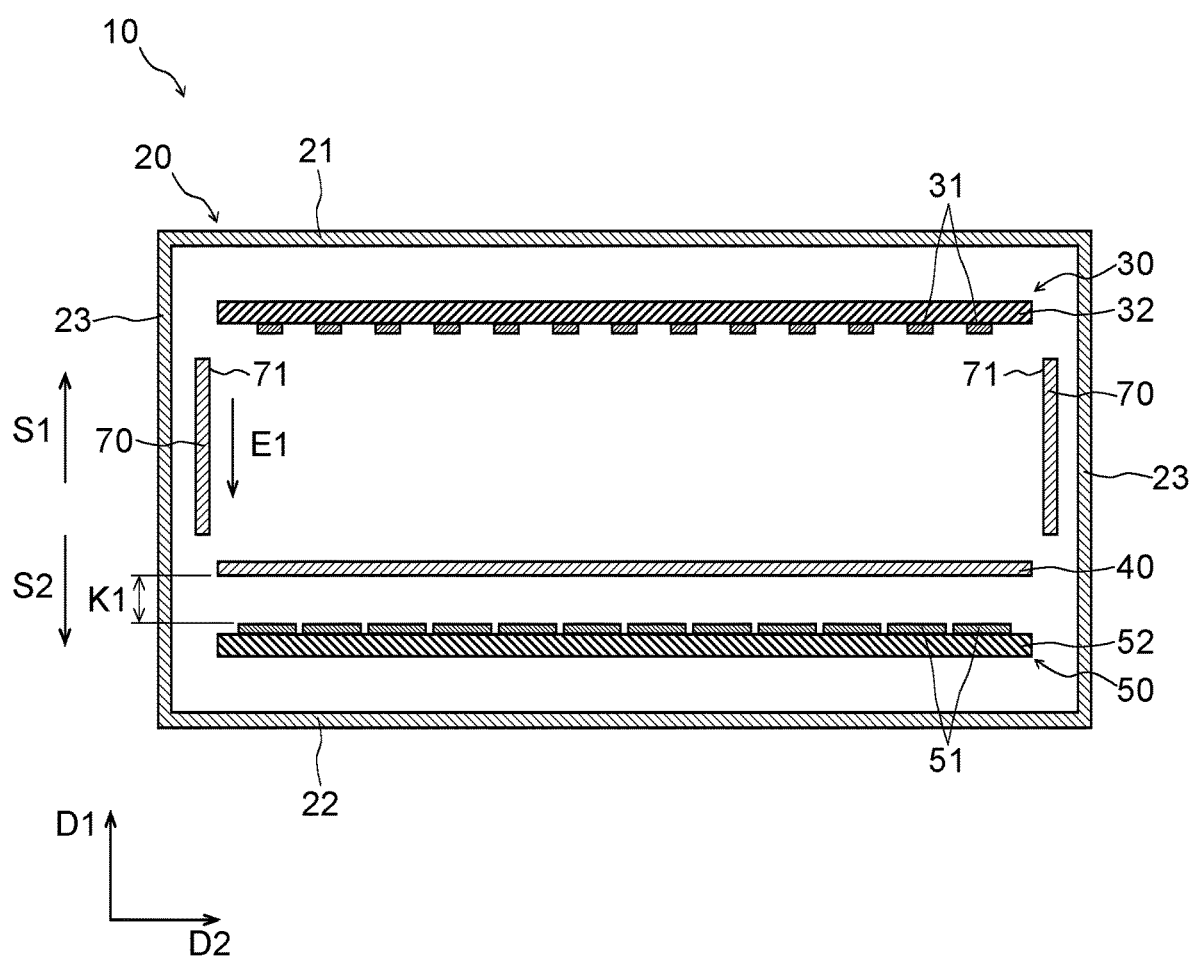
FIG. 7 is a sectional view of a second modification of the detection device according to the first embodiment.

FIG. 7 is a sectional view of a detection device 10 according to the second modification. The detection device 10 may include an auxiliary drift electrode 70 located between the electron detector 30 and the drift electrode 40. The auxiliary drift electrode 70 includes a surface 71 extending in a direction in which the electron detector 30 and the drift electrode 40 face each other. For example, the surface 71 extends in the first direction D1.

The auxiliary drift electrode 70 is provided to increase the uniformity of the electric field distribution between the electron detector 30 and the drift electrode 40. The auxiliary drift electrode 70 may surround the space between the electron detector 30 and the drift electrode 40. Although not illustrated, the auxiliary drift electrode 70 may include a plurality of electrodes arranged in the first direction D1. For example, the auxiliary drift electrode 70 may have a so-called cage-like structure in which a plurality of electrodes surround the space between the electron detector 30 and the drift electrode 40. The auxiliary drift electrode 70 may be fixed by a material such as an insulating resin.

Like the drift electrode 40, the auxiliary drift electrode 70 contains a conductive material. For example, auxiliary drift electrode 70 may contain a metal with a specific gravity of less than 4, such as aluminum.

Third Modification

Figure 8:
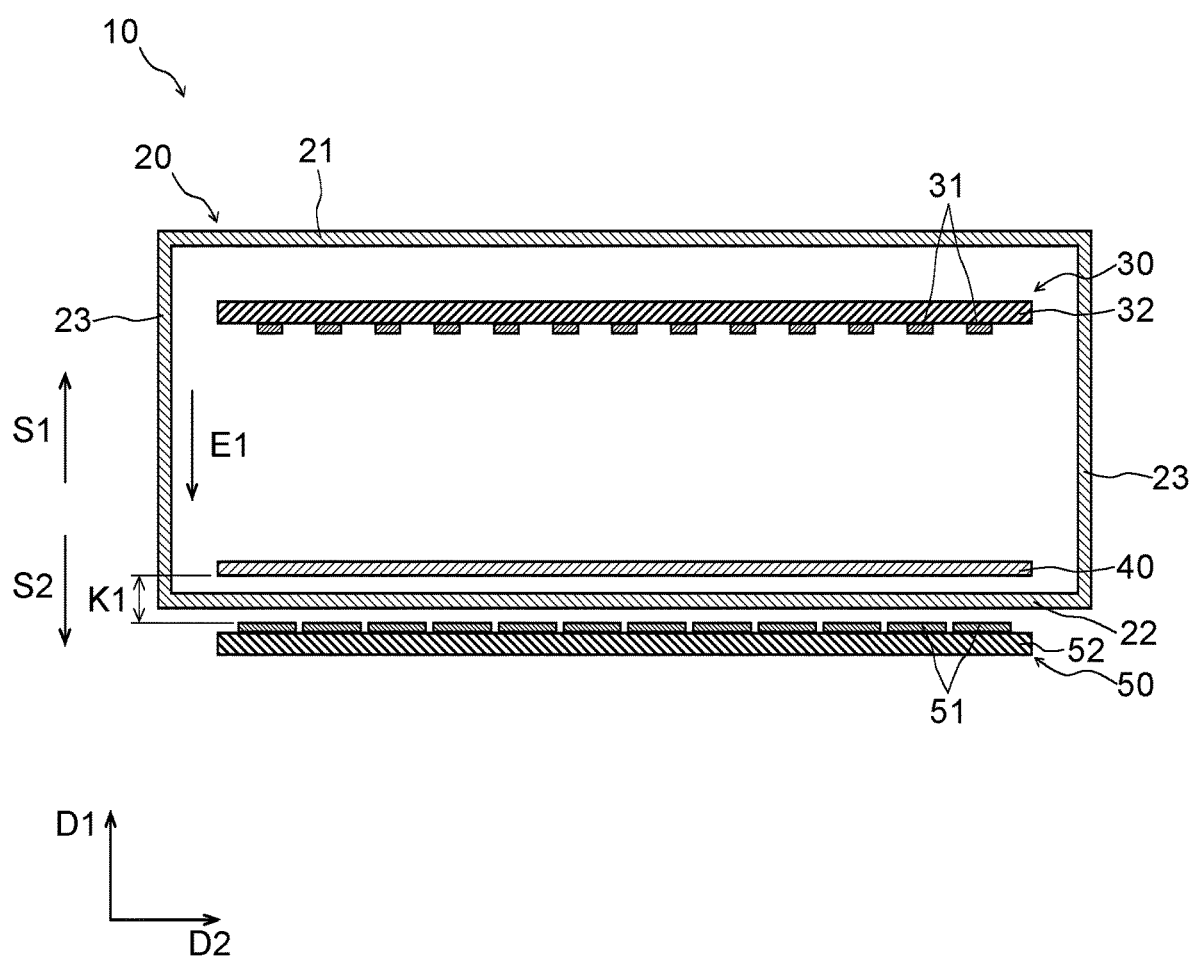
FIG. 8 is a sectional view of a third modification of the detection device according to the first embodiment.

FIG. 8 is a sectional view of a detection device 10 according to the third modification. As illustrated in FIG. 8, the radiation detector 50 may be located outside the container 20. For example, the radiation detector 50 may be located outside the second portion 22. The radiation detector 50 may face the drift electrode 40 with the second portion 22 interposed therebetween.

According to the present modification, by placing the radiation detector 50 outside of the container 20, it is possible to suppress gas outgassed from the radiation detector 50 from affecting the environment inside the container 20. As a result, for example, the density of the electron cloud formed on the track of the recoil electron R5 can be increased. In addition, when the electron amplifier 60 is provided inside the container 20, the amplification of electrons by the electron amplifier 60 can be further promoted.

According to the present modification, the radiation R3 scattered in the space between the electron detector 30 and the drift electrode 40 passes through the drift electrode 40 and the second portion 22 of the container 20 and, thereafter, reaches the radiation detector 50. To reduce scattering and attenuation of radiation in the second portion 22, it is desirable that the thickness of the second portion 22 be small.

Fourth Modification

Figure 9:
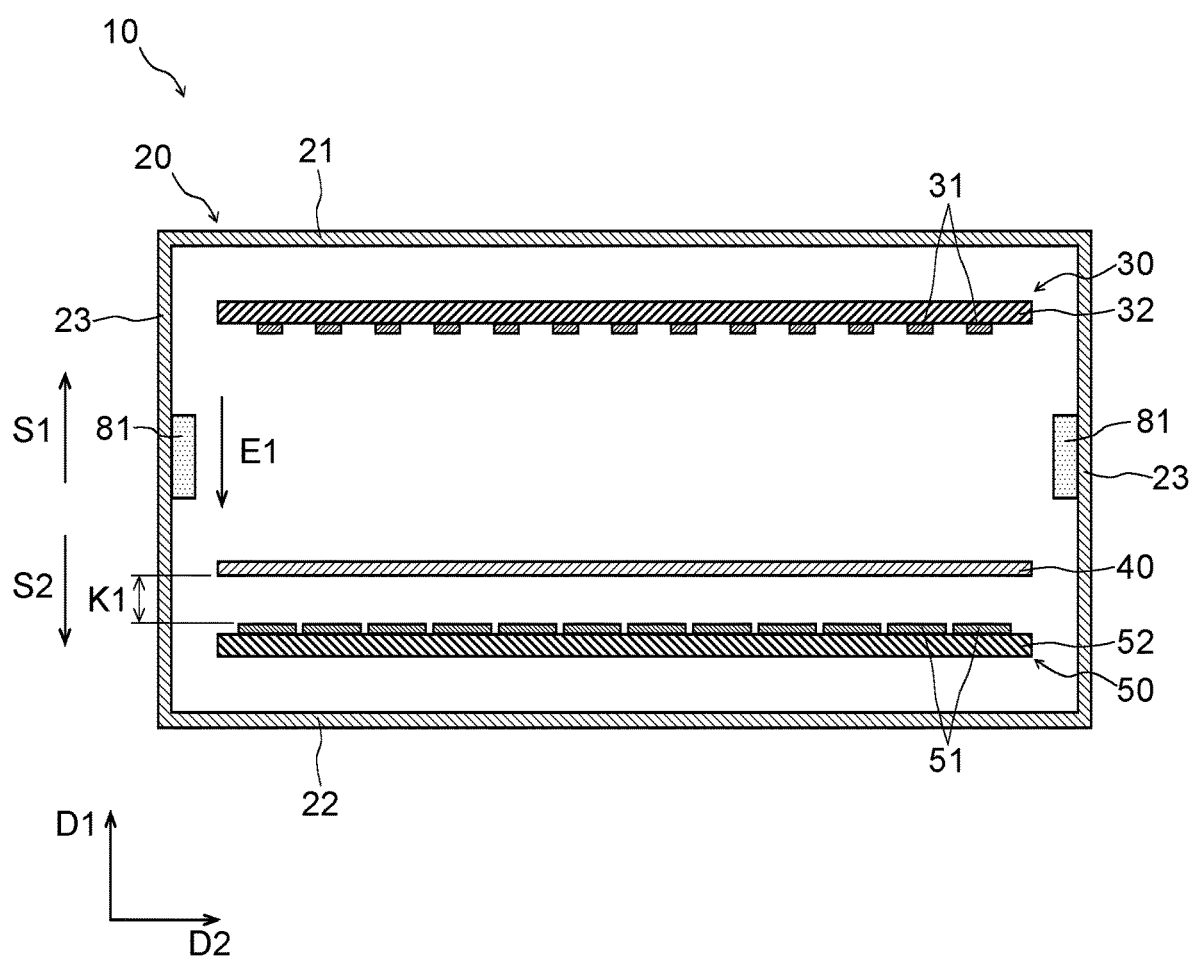
FIG. 9 is a sectional view of a fourth modification of the detection device according to the first embodiment.

FIG. 9 is a sectional view of a detection device 10 according to the fourth modification. The detection device 10 may include an adsorbent 81 located inside the container 20. The adsorbent 81 can adsorb gas outgassed from electrical components located inside the container 20. For example, the adsorbent 81 can adsorb water vapor, oxygen, and the like. The adsorbent 81 is, for example, an active metal, such as titanium or zirconium, or alloy getter material, an adsorbent material, such as zeolite or silica gel, or a getter pump.

It is desirable that the adsorbent 81 be disposed at a position where the adsorbent 81 does not interfere with radiation. For example, the adsorbent 81 may be disposed on the side portion 23 of the container 20.

Fifth Modification

Figure 10:
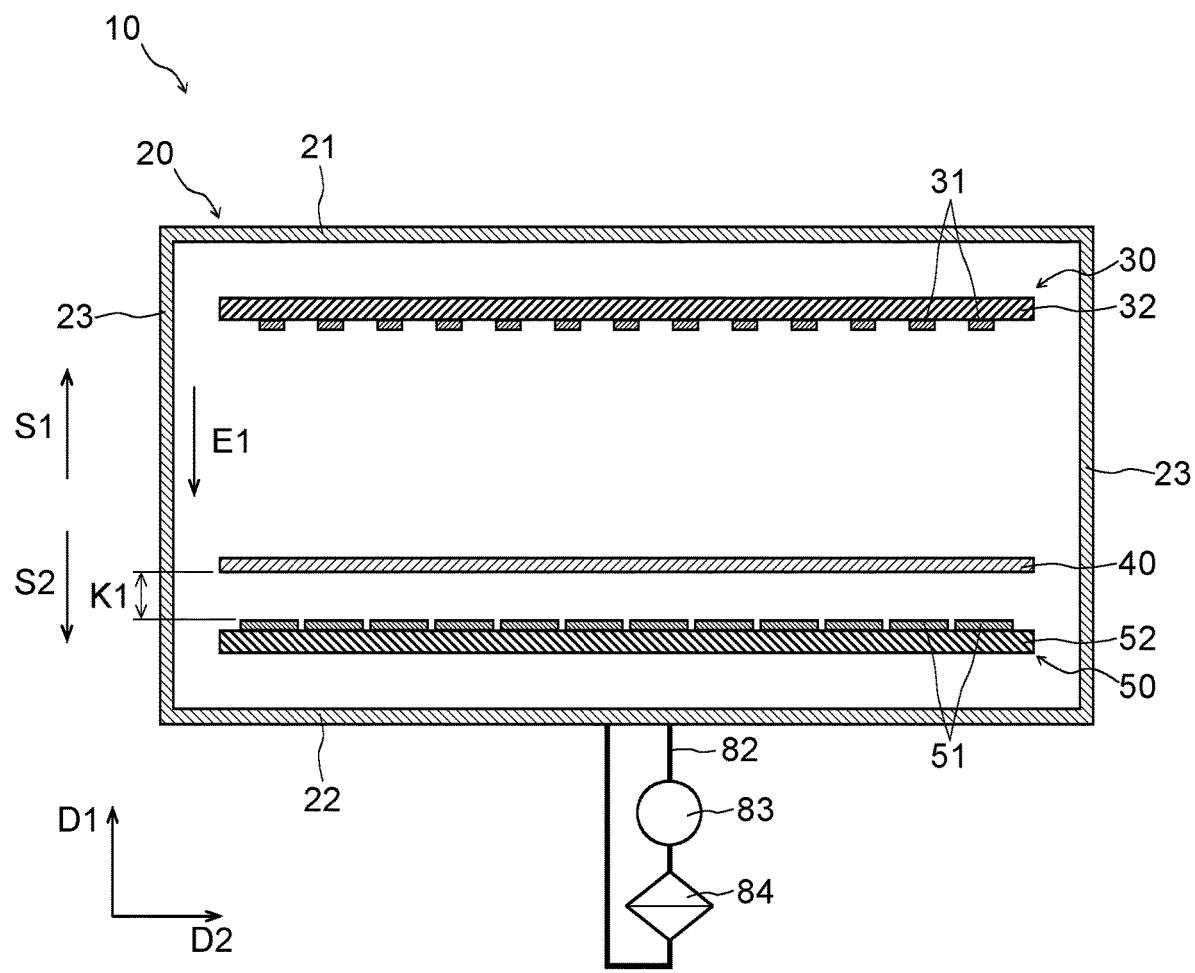
FIG. 10 is a sectional view of a fifth modification of the detection device according to the first embodiment.

FIG. 10 is a sectional view of a detection device 10 according to the fifth modification. The detection device 10 may include a device for removing gas outgassed from electrical components located inside the container 20. For example, the detection device 10 may include a circulation path 82 connected to the container 20 and a pump 83 and a filter 84 inserted into the circulation path 82.

The pump 83 sucks the gas inside the container 20 into the circulation path 82. The filter 84 removes unnecessary components, such as water vapor and oxygen, from the gas sucked into circulation path 82. The gas from which unnecessary components have been removed is returned to the inside of the container 20 again.

Sixth Modification

Figure 11:
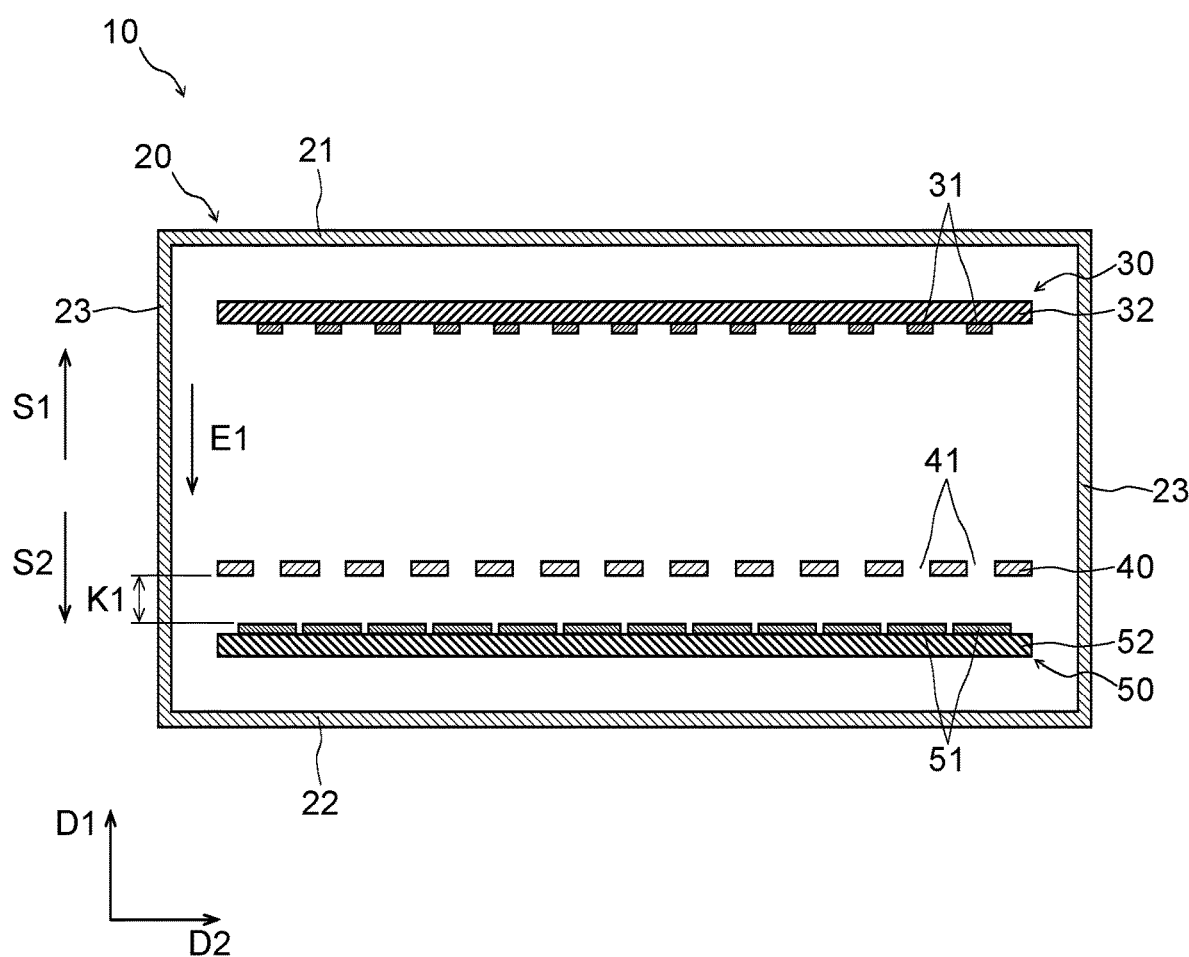
FIG. 11 is a sectional view of a sixth modification of the detection device according to the first embodiment.

FIG. 11 is a sectional view of a detection device 10 according to the sixth modification. As illustrated in FIG. 11, the drift electrode 40 may include a plurality of through-holes 41. The through-hole 41 may overlap the detection element 51 in the direction in which the drift electrode 40 and the radiation detector 50 face each other, for example, in the first direction D1.

According to the present modification, part of the radiation R3 scattered by Compton scattering passes through the through-hole 41 of the drift electrode 40 and reaches the radiation detector 50. Therefore, the occurrence of scattering and attenuation of radiation in the drift electrode 40 can be reduced, as compared with the case where the radiation is transmitted through the drift electrode 40. As a result, information regarding the scattered radiation R3 can be obtained more accurately.

While several modifications of the above-described first embodiment have been described, the plurality of modifications can be appropriately combined.

Second Embodiment

The second embodiment of the present disclosure is described below. According to the second embodiment, the same parts as those according to the first embodiment are identified by the same reference signs, and detailed description is omitted. In addition, when it is clear that the operation and effect obtained in the first embodiment can also be obtained in the present embodiment, description of the operation and effect may be omitted.

Figure 12:
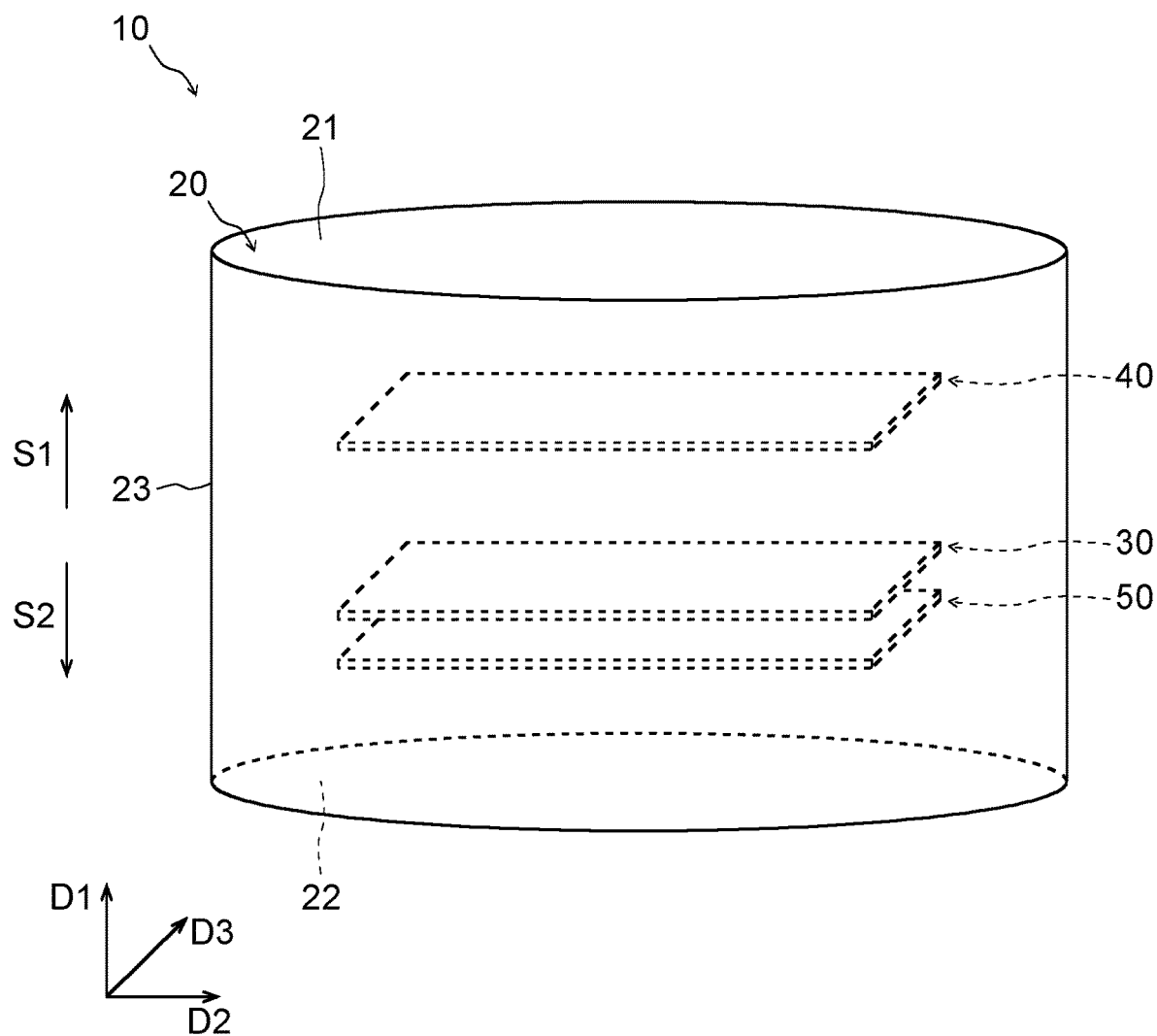
FIG. 12 is a perspective view of an example of a detection device according to a second embodiment.
Figure 13:
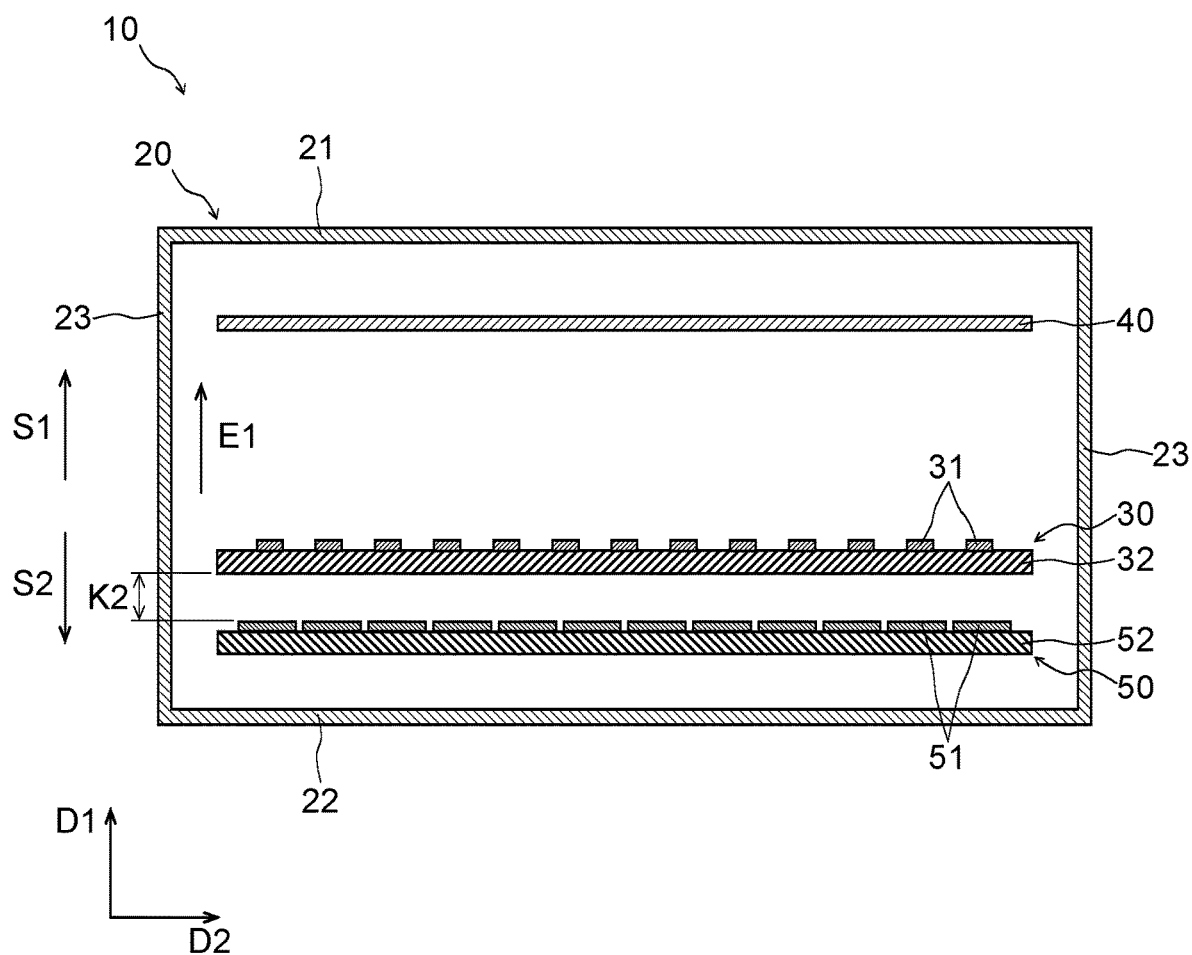
FIG. 13 is a sectional view of the detection device illustrated in FIG. 12.

FIG. 12 is a perspective view of an example of the detection device 10. FIG. 13 is a sectional view of the detection device 10 illustrated in FIG. 12. The detection device 10 includes a container 20 and a drift electrode 40, an electron detector 30, and a radiation detector 50 located inside the container 20. The drift electrode 40, the electron detector 30, and the radiation detector 50 are arranged in this order from the first portion 21 to the second portion 22. That is, the drift electrode 40 is located closer to the first portion 21 than the electron detector 30. The radiation detector 50 is located closer to the second portion 22 than the electron detector 30. The phrase "A constituent element A is located closer to the first portion 21 than a constituent element B" means that the constituent element A is located on the side indicated by an arrow S1 in FIG. 12 with respect to the constituent element B. The arrow S1 represents the direction from the second portion 22 to the first portion 21. The distance from the constituent element B to the first portion 21 may be greater or less than the distance from constituent element B to constituent element A.

The drift electrode 40 may be closer to the first portion 21 than to the second portion 22. The electron detector 30 and the radiation detector 50 may be closer to the second portion 22 than to the first portion 21.

The radiation detector 50 is electrically insulated from the electron detector 30. For example, a distance K2 between the radiation detector 50 and the electron detector 30 is set so as to ensure electrical insulation. A gas, an insulator, or the like may be located between the electron detector 30 and the radiation detector 50. As a result, the occurrence of defects, such as discharge between the electron detector 30 and the radiation detector 50, can be reduced.

(Operation Performed by Detection Device)

Figure 14:
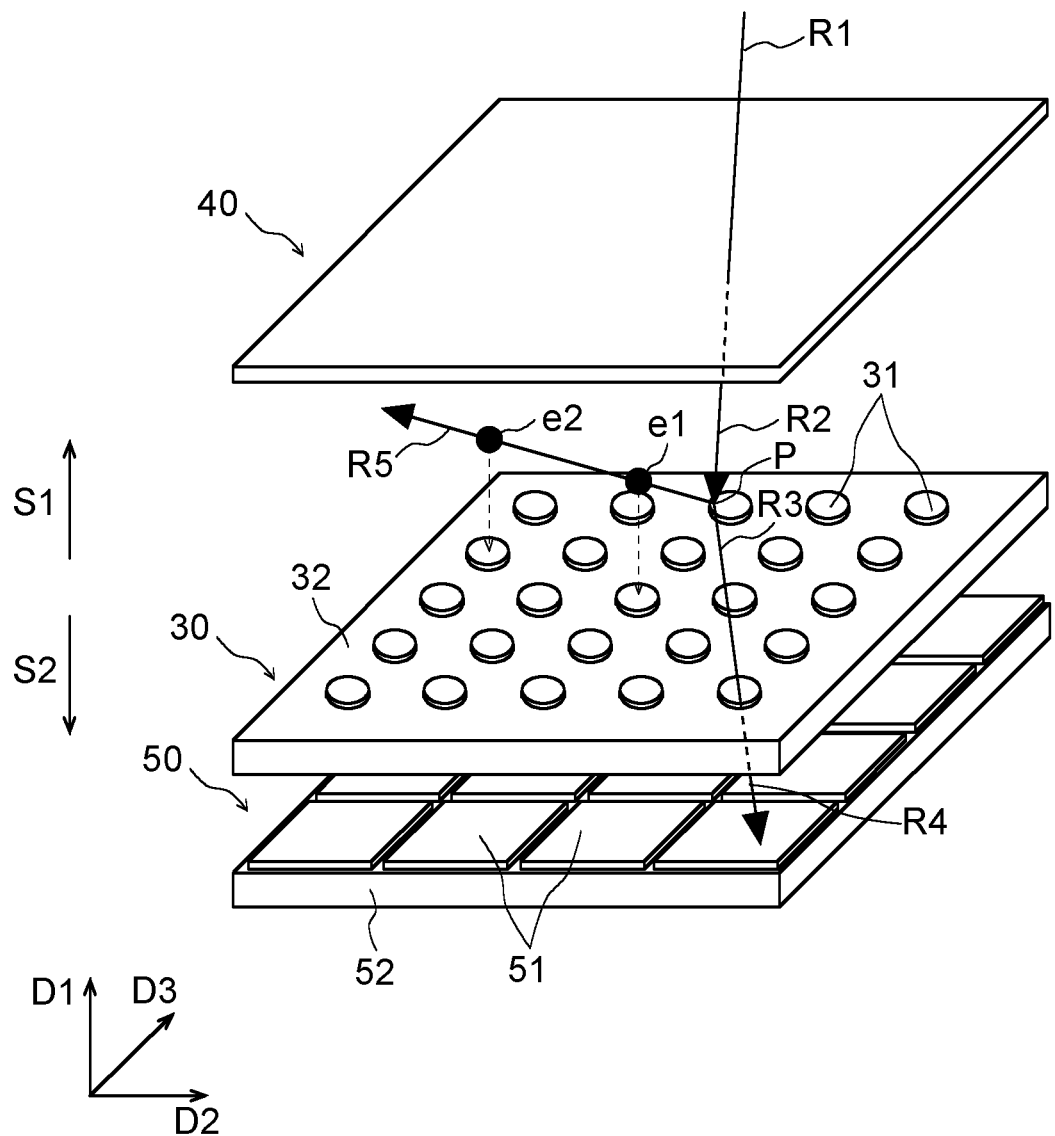
FIG. 14 is an explanatory diagram of the operation performed by the detection device illustrated in FIG. 12.

An example of the operation performed by the detection device 10 is described below with reference to FIG. 14. In FIG. 14, the container 20 is not illustrated.

The radiation R1 incident on the inside of the container 20 passes through the drift electrode 40 and, thereafter, reaches the space between the electron detector 30 and the drift electrode 40. Reference sign R2 represents the radiation that reaches the space between the electron detector 30 and the drift electrode 40. The energy of the radiation R2 may be lower than the energy of the radiation R1 due to scattering and attenuation that occurs when the radiation R1 passes through drift electrode 40.

The radiation R3 scattered in the space between the electron detector 30 and the drift electrode 40 passes through the electron detector 30 and, thereafter, reaches the radiation detector 50. Reference sign R4 represents the radiation that reaches the radiation detector 50. The energy of the radiation R4 may be lower than the energy of radiation R3 due to scattering and attenuation that occurs when the radiation R3 passes through the electron detector 30. The radiation R4 is detected by one of the plurality of detection elements 51. Thus, the reaching position and the energy of the radiation R4 can be calculated.

Each of electrons of the electron cloud formed along the track of the recoil electron R5 is attracted toward the electron detector 30 by the electric field E1. For example, electrons e1 and e2 are detected by the collector electrodes 31 corresponding to the respective positions of the electrons e1 and e2. Thus, the positions and energies of the electrons e1 and e2 can be calculated. In addition, the track and energy of the recoil electron R5 and the scattered point P can be calculated.

Like the first embodiment, according to the present embodiment, the radiation detector 50 is located inside the container 20. Therefore, the occurrence of scattering, attenuation, and the like of radiation before the radiation reaches the radiation detector 50 can be reduced, as compared with the case where the radiation detector 50 is located outside the container 20. As a result, information regarding the radiation R3 scattered in the space between the electron detector 30 and the drift electrode 40 can be obtained more accurately.

In addition, according to the present embodiment, the drift electrode 40 is located closer to the first portion 21 than the electron detector 30. When the drift electrode 40 contains a metal with a small specific gravity, the radiation passing through the drift electrode 40 is less likely to be affected by the drift electrode 40. Accordingly, as compared with the case where the electron detector 30 is located closer to the first portion 21 than the drift electrode 40, the energy decrease ratio of the radiation R2 that reaches the space between the electron detector 30 and the drift electrode 40 decreases. That is, the ratio of the difference between the energy of the radiation R1 incident on the container 20 and the energy of the radiation R2 that reaches the space between the electron detector 30 and the drift electrode 40 to the energy of the radiation R1 decreases. Moreover, the difference between the radiation dose of the radiation R1 and the radiation dose of the radiation R2 decreases. Therefore, the probability of the occurrence of expected Compton scattering in the space between the electron detector 30 and the drift electrode 40 can be increased. Furthermore, by decreasing the energy decrease ratio of the radiation R2, it is possible to increase the probability that the scattered radiation R3, which produces an expected measurement value, is directed toward the second portion 22.

In addition, according to the present embodiment, the scattered radiation R3 reaches the radiation detector 50 after passing through the electron detector 30. Accordingly, scattering, attenuation, or the like of radiation is more likely to occur before the scattered radiation reaches the radiation detector 50 than in the first embodiment. Considering this fact, if radiation having energy significantly lower than the expected energy is detected, the radiation detector 50 may ignore information indicating this. As a result, it is possible to suppress an incorrect scattered point P from being calculated.

The present embodiment is particularly useful when the types of radiation R1 and R2 before being scattered are known. According to the present embodiment, by increasing the probability that the expected Compton scattering occurs in the space between the electron detector 30 and the drift electrode 40, it is possible to efficiently obtain information regarding the doses and distribution of radiation.

Various modifications can be made to the second embodiment described above. For example, like the first modification of the first embodiment, the detection device 10 may include an electron amplifier 60 located between the electron detector 30 and the drift electrode 40. Like the second modification of the first embodiment, the detection device 10 may include an auxiliary drift electrode 70 located between the electron detector 30 and the drift electrode 40. Like the fourth modification of the first embodiment, the detection device 10 may include an adsorbent 81 located inside the container 20. Like the fifth modification of the first embodiment, the detection device 10 may include a device for removing gas outgassed from electrical components located inside the container 20. Like the sixth modification of the first embodiment, the drift electrode 40 may include a plurality of through-holes 41.

Figure 20:
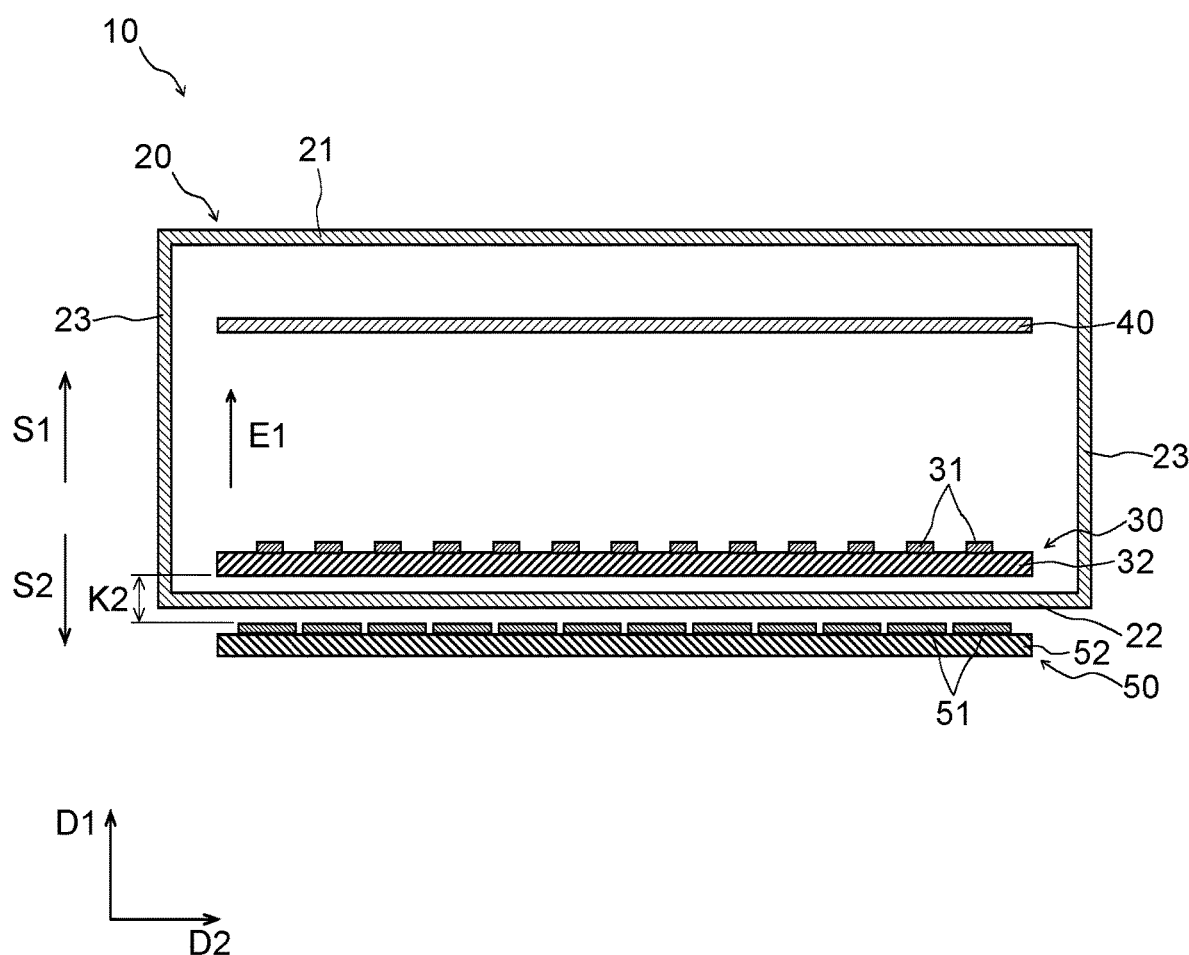
FIG. 20 is a sectional view of a modification of the detection device according to the second embodiment.

Like the third modification of the first embodiment, the radiation detector 50 may be located outside the container 20. For example, as illustrated in FIG. 20, the radiation detector 50 may be located outside the second portion 22. The radiation detector 50 may face the electron detector 30 with the second portion 22 interposed therebetween.

While several modifications of the above-described second embodiment have been described, the plurality of modifications can be appropriately combined.

Third Embodiment

The third embodiment of the present disclosure is described below. According to the third embodiment, parts similar to those described in the first embodiment are identified by the same reference signs as in the first embodiment, and detailed description is omitted. In addition, when it is clear that the operation and effect obtained in the first embodiment can also be obtained in the present embodiment, description of the operation and effect may be omitted.

Figure 15:
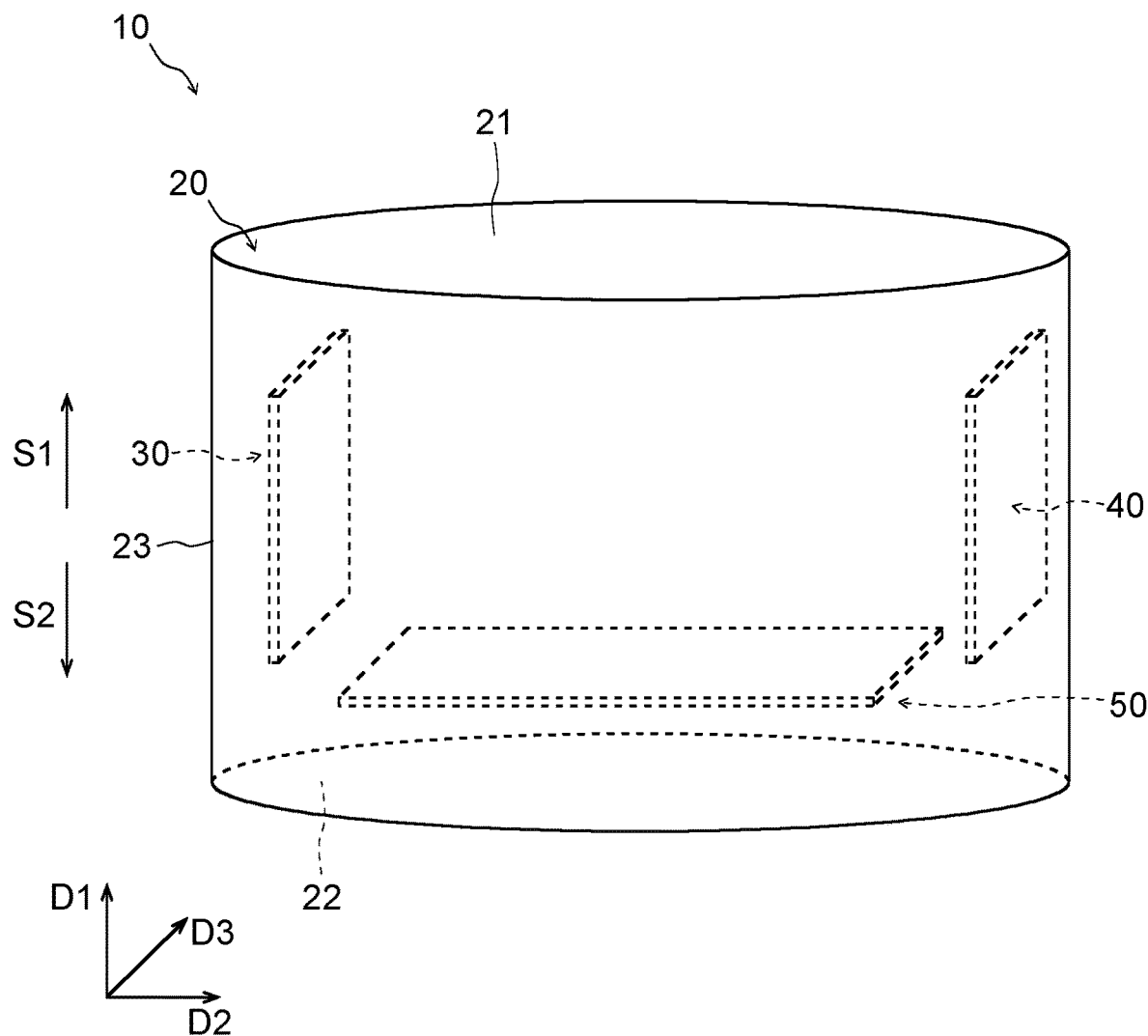
FIG. 15 is a perspective view of an example of a detection device according to a third embodiment.
Figure 16:
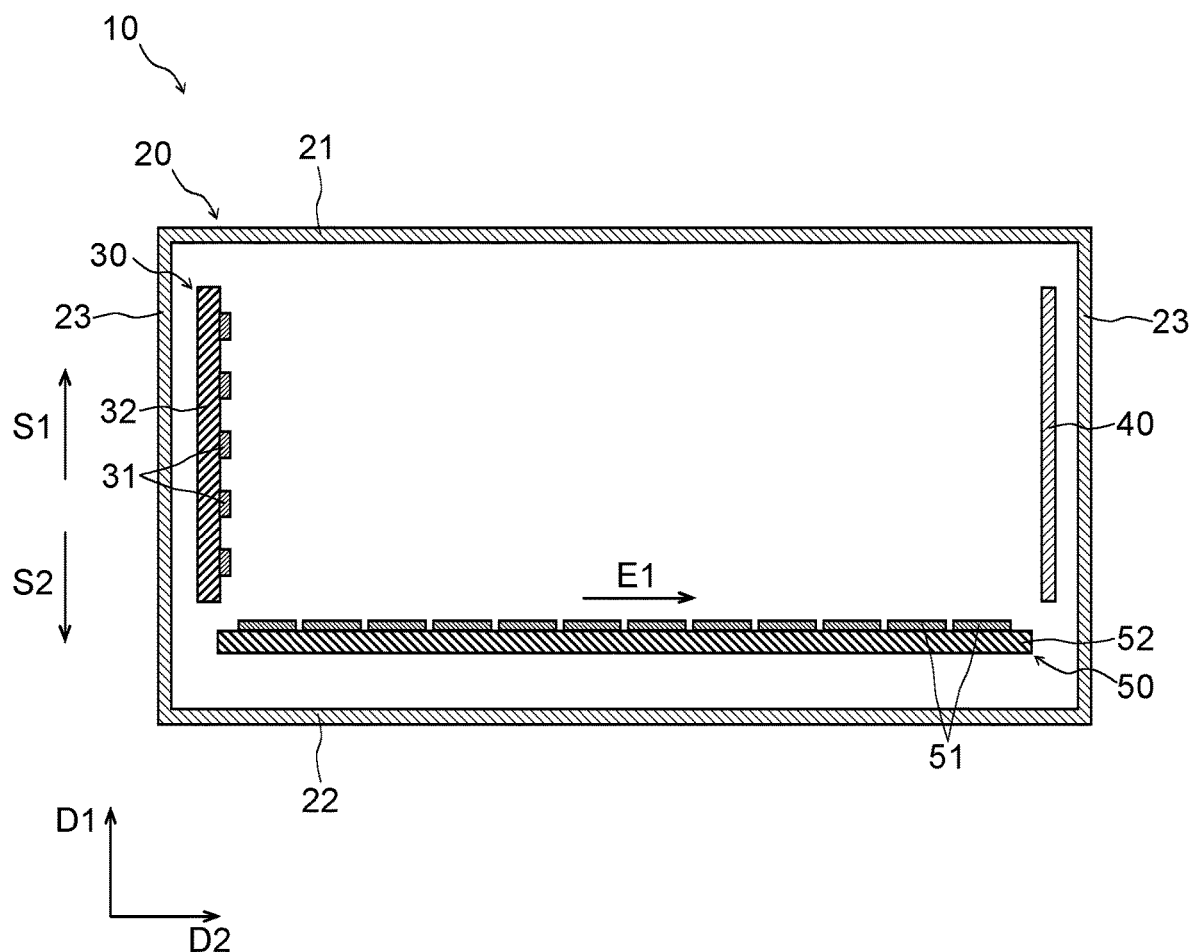
FIG. 16 is a sectional view of the detection device illustrated in FIG. 15.

FIG. 15 is a perspective view of an example of a detection device 10. FIG. 16 is a sectional view of the detection device 10 illustrated in FIG. 15. The detection device 10 includes a container 20 and an electron detector 30, a drift electrode 40, and a radiation detector 50 located inside the container 20.

The electron detector 30 and the drift electrode 40 face each other in a direction crossing the first direction D1. For example, the electron detector 30 and the drift electrode 40 may face each other in a second direction D2 perpendicular to the first direction D1.

The radiation detector 50 detects radiation scattered in the space between the electron detector 30 and the drift electrode 40. The radiation detector 50 may be closer to the second portion 22 than to the first portion 21. In an example illustrated in FIGS. 15 and 16, the radiation detector 50 does not overlap the electron detector 30 and the drift electrode 40 in the second direction D2. Although not illustrated, the radiation detector 50 may overlap the electron detector 30 and the drift electrode 40 in the second direction D2.

(Operation Performed by Detection Device)

Figure 17:
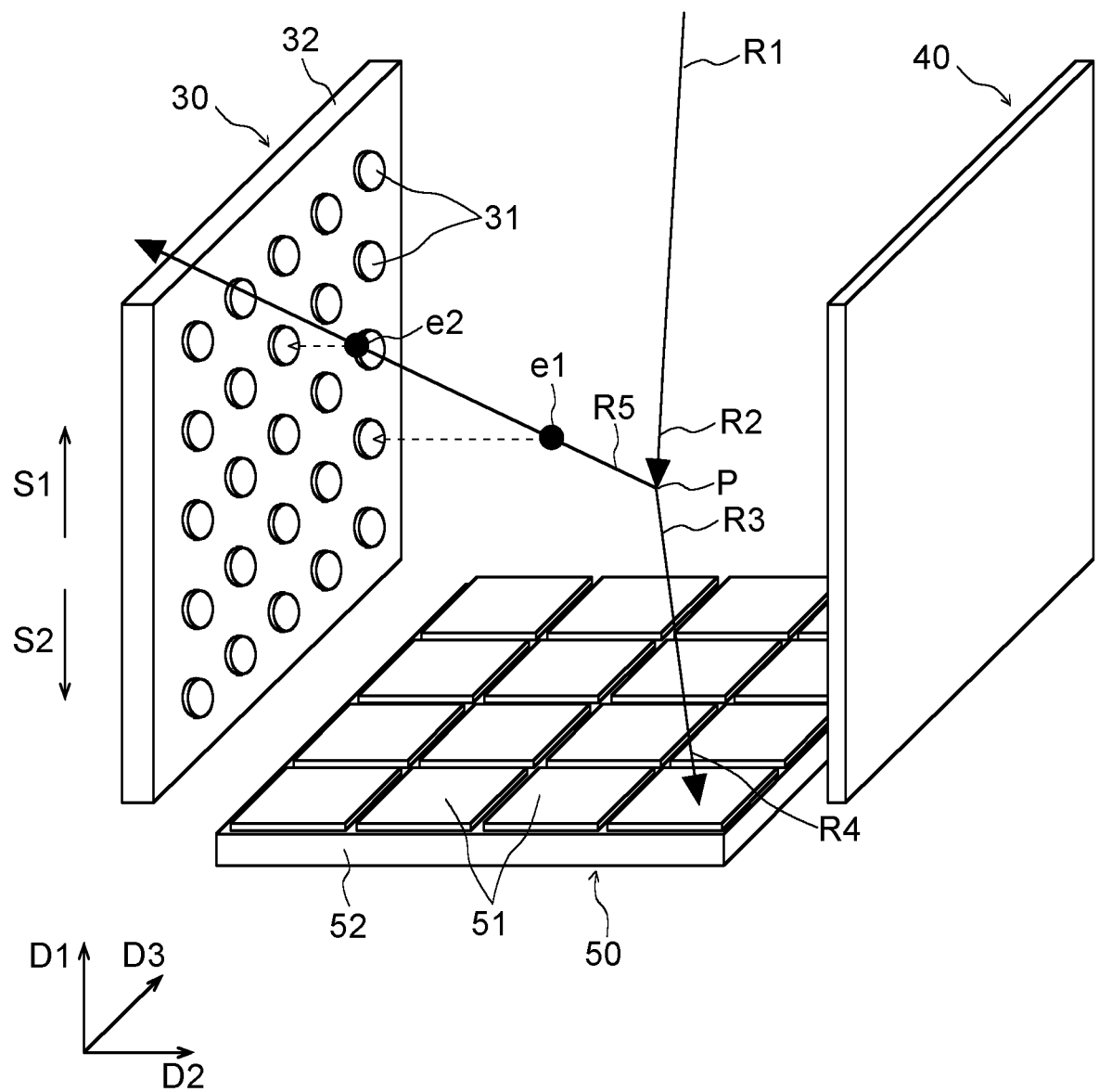
FIG. 17 is an explanatory diagram of the operation performed by the detection device illustrated in FIG. 15.

An example of the operation performed by the detection device 10 is described below with reference to FIG. 17. In FIG. 17, the container 20 is not illustrated.

The radiation R1 incident on the inside of the container 20 from the first portion 21 reaches the space between the electron detector 30 and the drift electrode 40. Reference sign R2 represents radiation that reaches the space between the electron detector 30 and the drift electrode 40.

The radiation R3 scattered in the space between the electron detector 30 and the drift electrode 40 reaches the radiation detector 50. Reference sign R4 represents radiation that reaches the radiation detector 50.

Each of electrons of the electron cloud formed along the track of the recoil electron R5 is attracted toward the electron detector 30 by the electric field E1. For example, electrons e1 and e2 are detected by the collector electrodes 31 corresponding to the respective positions of electrons e1 and e2. Thus, the positions and energies of the electrons e1 and e2 can be calculated. In addition, the track and energy of the recoil electron R5 and a scattered point P can be calculated.

Like the first embodiment, according to the present embodiment, the radiation detector 50 is located inside the container 20. Therefore, it is possible to reduce the occurrence of scattering, attenuation, and the like of radiation before the radiation reaches the radiation detector 50, as compared with the case where the radiation detector 50 is located outside the container 20. Accordingly, information regarding the radiation R3 scattered in the space between the electron detector 30 and the drift electrode 40 can be obtained more accurately.

In addition, according to the present embodiment, the radiation R1 incident on the inside of the container 20 can reach the space between the electron detector 30 and the drift electrode 40 without passing through electrical components, such as the electron detector 30 and the drift electrode 40. Therefore, unlike the first and second embodiments described above, the energy and radiation dose of the radiation R1 incident on the inside of the container 20 are almost the same as the energy and radiation dose of the radiation R2 that has reached the space between the electron detector 30 and the drift electrode 40. Therefore, the probability of the occurrence of expected Compton scattering in the space between the electron detector 30 and the drift electrode 40 can be increased. In addition, since the radiation R2 is equivalent to the radiation R1, it is possible to increase the probability that the scattered radiation R3, which produces an expected measurement value, is directed toward the second portion 22.

In addition, according to the present embodiment, the radiation R3 scattered in the space between the electron detector 30 and the drift electrode 40 can reach the radiation detector 50 without passing through electrical components, such as the electron detector 30 and the drift electrode 40. Therefore, unlike the first and second embodiments described above, the energy and radiation dose of the scattered radiation R3 are almost the same as the energy and radiation dose of the radiation R4 reaching the radiation detector 50. As a result, information regarding the scattered radiation R3 can be obtained more accurately.

Various modifications can be made to the third embodiment described above. The modifications are described below with reference to the accompanying drawings as necessary. In the following description and the drawings used in the description, parts configured similarly to those according to the third embodiment are identified by the same reference signs as those used for the corresponding parts according to the first embodiment, and redundant description is omitted. Furthermore, when it is clear that the operation and effect obtained in the third embodiment can be obtained in the modification, description of the operation and effect may be omitted.

(First Modification)

Figure 18:
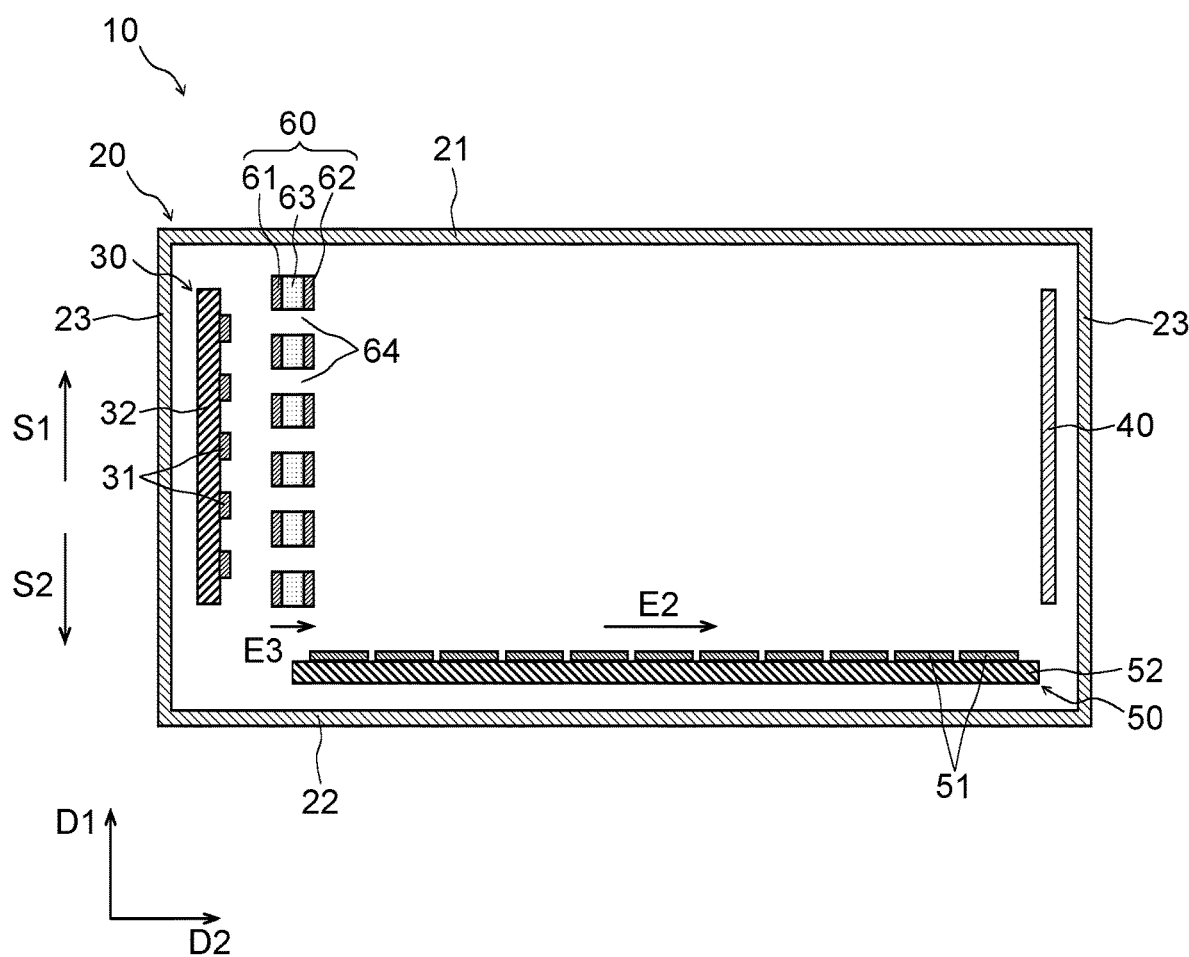
FIG. 18 is a sectional view of a first modification of the detection device according to the third embodiment.

FIG. 18 is a sectional view of the detection device 10 according to the first modification. The detection device 10 may include an electron amplifier 60 located between the electron detector 30 and the drift electrode 40. For example, the electron amplifier 60 is disposed to face the electron detector 30 and the drift electrode 40 in the second direction D2. Use of the electron amplifier 60 increases the number of electrons to be measured. Therefore, the positions of electrons and the like can be detected with higher accuracy.

(Second Modification)

Figure 19:
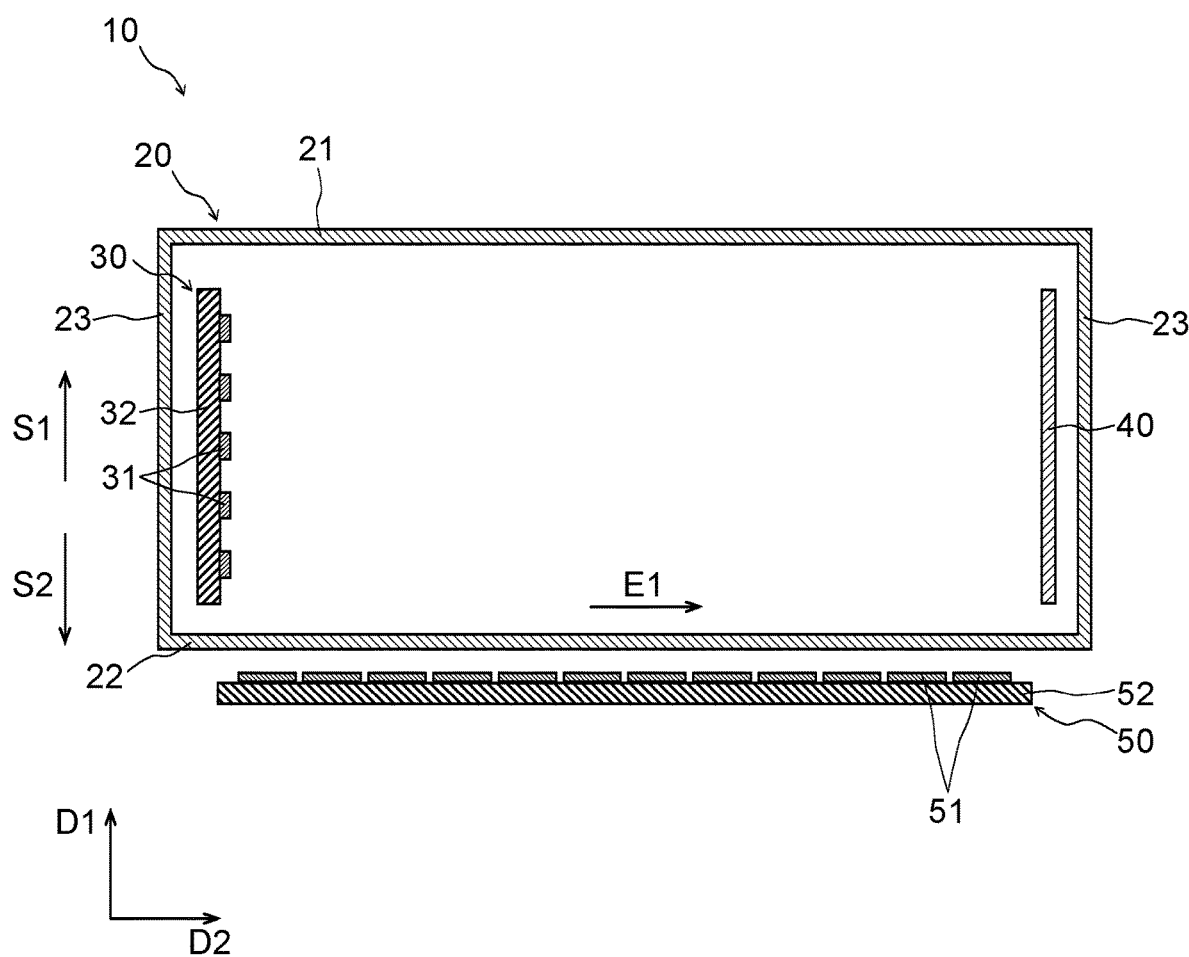
FIG. 19 is a sectional view of a second modification of the detection device according to the third embodiment.

FIG. 19 is a sectional view of a detection device 10 according to the third modification. As illustrated in FIG. 19, the radiation detector 50 may be located outside the container 20. For example, the radiation detector 50 may be located outside the second portion 22. The radiation detector 50 may face the second portion 22.

According to the present modification, by placing the radiation detector 50 outside the container 20, it is possible to suppress the gas outgassed from the radiation detector 50 from affecting the environment inside the container 20. As a result, for example, the density of the electron cloud formed along the track of the recoil electron R5 can be increased. Furthermore, when the electron amplifier 60 is provided inside the container 20, the amplification of electrons by the electron amplifier 60 can be further promoted.
(Other Modifications)

Like the second modification of the first embodiment, the detection device 10 may include an auxiliary drift electrode 70 located between the electron detector 30 and the drift electrode 40. Like the fourth modification of the first embodiment, the detection device 10 may include the adsorbent 81 located inside the container 20. Like the fifth modification of the first embodiment, the detection device 10 may include a device for removing the gas outgassed from electrical components located inside the container 20. Like the sixth modification of the first embodiment, the drift electrode 40 may include a plurality of through-holes 41.

While several modifications of the above-described third embodiment have been described, the plurality of modifications can be appropriately combined.

Common modifications are described below. The common modifications can be applied to any one of the first, second, and third embodiments.
(First Common Modification)

Figure 21:
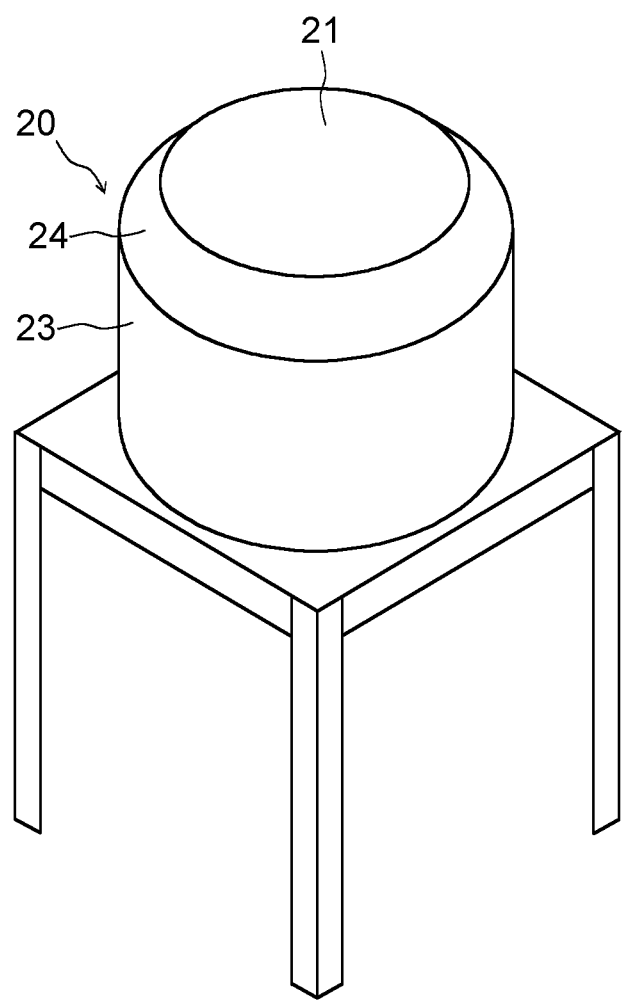
FIG. 21 is a perspective view of a container according to a first common modification.

FIG. 21 is a perspective view of a container 20 according to the first common modification. As illustrated in FIG. 21, the container 20 may include a first portion 21, a side portion 23, and a corner 24 located between the first portion 21 and the side portion 23. The first portion 21 may extend flatly. The corner 24 may include a surface that extends in a direction different from the extending directions of the first portion 21 and the side portion 23.

Figure 22:
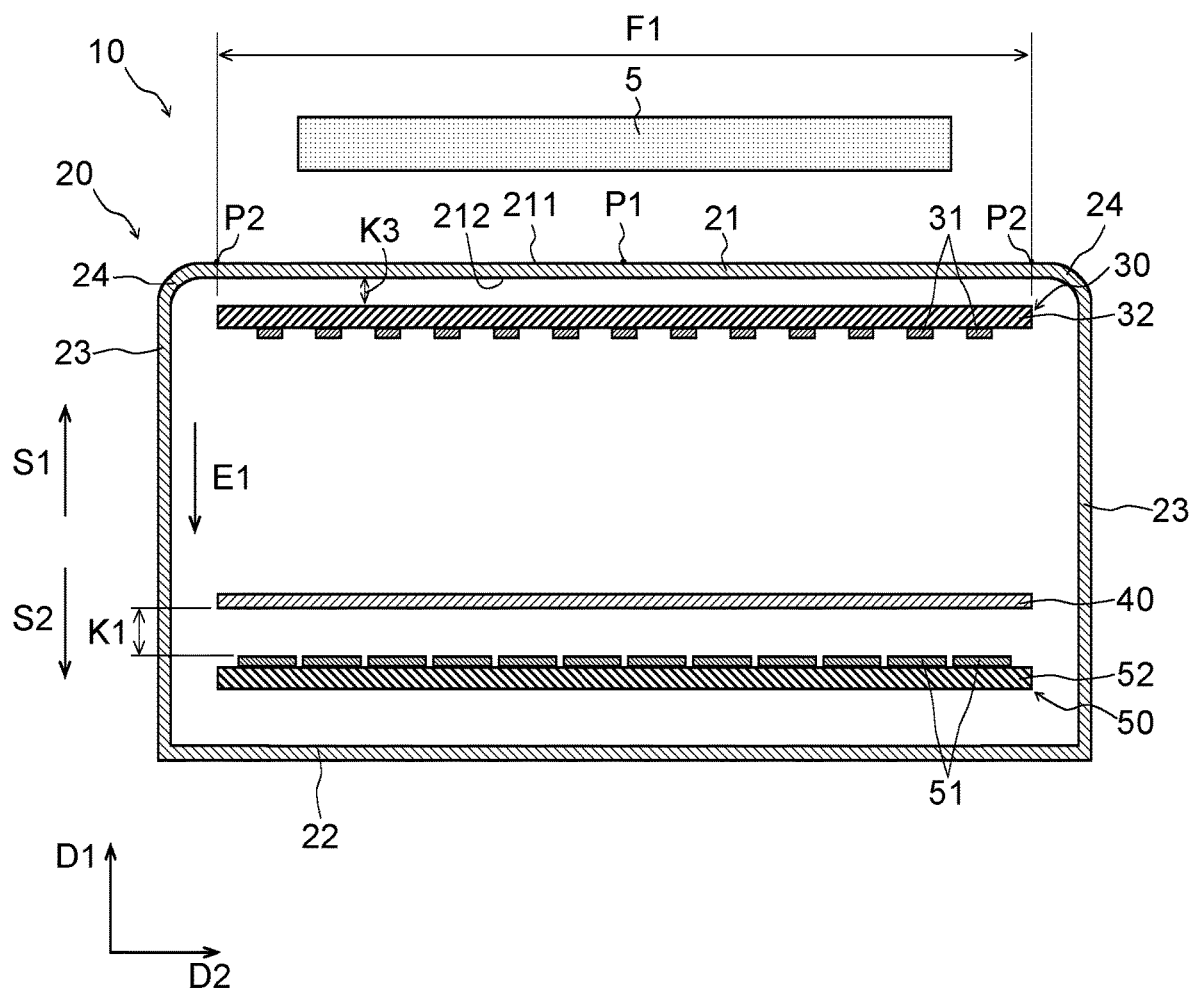
FIG. 22 is a sectional view of an example in which the container according to the first common modification is applied to the first embodiment.

FIG. 22 is a sectional view of an example in which the container 20 according to the first common modification is applied to the first embodiment. The first portion 21 includes an outer surface 211 and an inner surface 212. The outer surface 211 may face a physical object 5. The physical object 5 emits radiation. The detection device 10 can detect radiation incident on the inside of the container 20 through the first portion 21.

As illustrated in FIG. 22, the outer surface 211 may extend flatly. It is desirable that the outer surface 211 extend flatly over a range F1. For example, the difference between the position of a point P1 and the position of a point P2 in a facing direction is 10 mm or less. In this manner, the distance from the physical object 5 to the electron detector 30 can be decreased. Consequently, the resolution of the measurement can be increased. The range F1 is a range that overlaps the electron detector 30 when viewed in the direction in which the electron detector 30 and the drift electrode 40 face each other (hereinafter also referred to as a "facing direction"). The point P1 on the outer surface 211 overlaps the center point of the electron detector 30 when viewed in the facing direction. The point P2 on the outer surface 211 overlaps an edge of the electron detector 30 when viewed in the facing direction.

Reference sign K3 represents the distance between the electron detector 30 and the inner surface 212 of the first portion 21 in the facing direction. By reducing the distance K3, the distance from the physical object 5 to the electron detector 30 can be reduced. The distance K3 is, for example, 10 mm or less. The distance K3 may be 5 mm or less or may be 2 mm or less. The distance K3 may be 0 mm. That is, the electron detector 30 may be in contact with the inner surface 212.

As illustrated in FIG. 22, the inner surface 212 may extend flatly. Thus, the distance K3 can be reduced over the entire electron detector 30.

As illustrated in FIG. 22, the corner 24 may be curved so as to protrude outward from the container 20. Thus, the rigidity of the container 20 can be increased.

Figure 23:
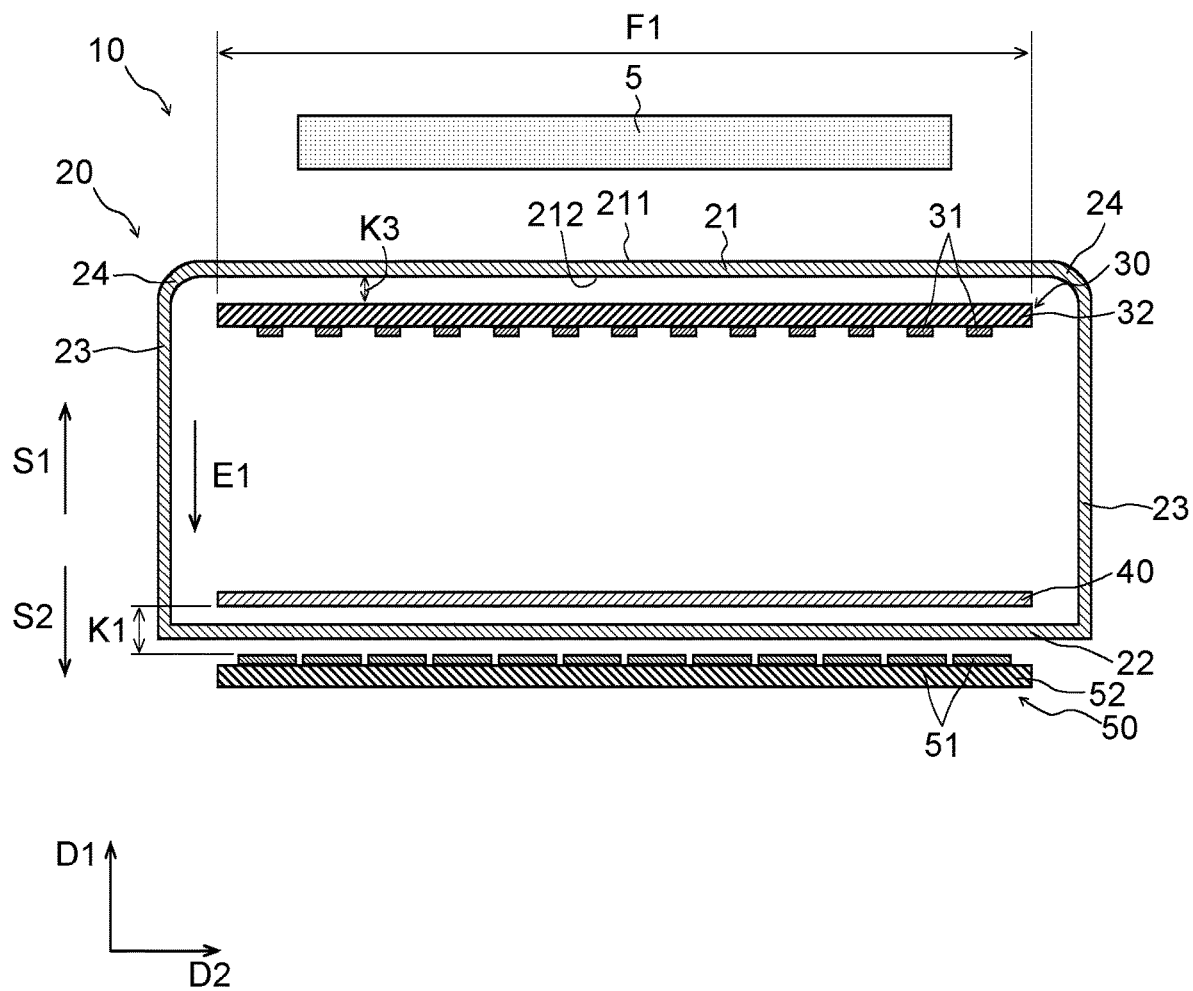
FIG. 23 is a sectional view of an example in which the container according to the first common modification is applied to the first embodiment.

FIG. 23 is a sectional view of another example in which the container 20 according to the first common modification is applied to the first embodiment. As illustrated in FIG. 23, the radiation detector 50 may be located outside the second portion 22. The radiation detector 50 may face the drift electrode 40 with the second portion 22 interposed therebetween.

Figure 24:
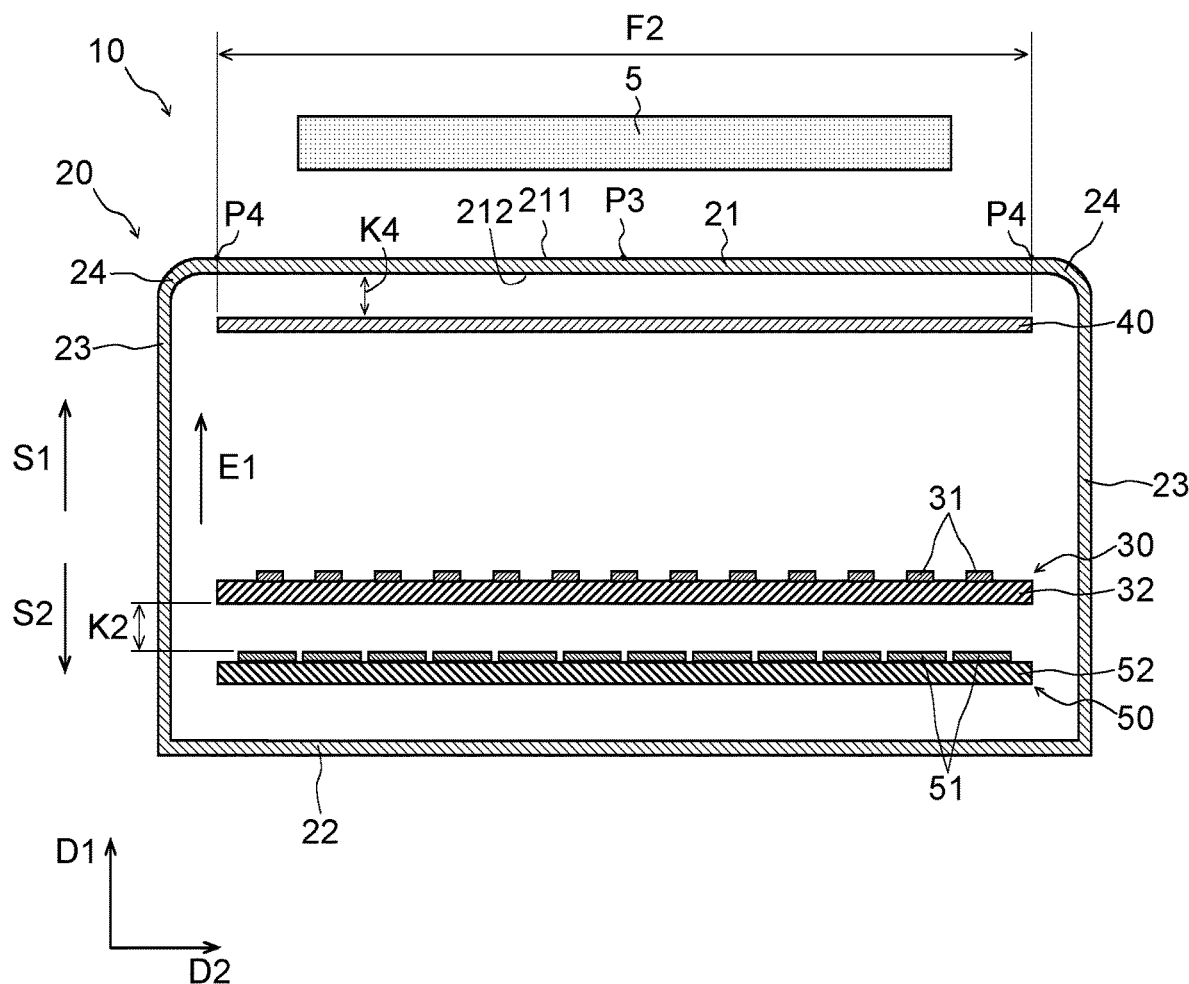
FIG. 24 is a sectional view of an example in which the container according to the first common modification is applied to the second embodiment.

FIG. 24 is a sectional view of an example in which the container 20 according to the first common modification is applied to the second embodiment. It is desirable that the outer surface 211 extend flatly over an area F2. For example, the difference between the position of a point P3 and the position of a point P4 in the facing direction is 10 mm or less. In this manner, the distance from the physical object 5 to the drift electrode 40 can be reduced. Consequently, the resolution of the measurement can be increased. The range F2 is a range that overlaps the drift electrode 40 when viewed in the facing direction. The point P3 on the outer surface 211 overlaps the center point of the drift electrode 40 when viewed in the facing direction. The point P4 on the outer surface 211 overlaps an edge of the drift electrode 40 when viewed in the facing direction.

Reference sign K4 represents the distance between the drift electrode 40 and the inner surface 212 of the first portion 21. By reducing the distance K4, the distance from the physical object 5 to the drift electrode 40 can be reduced. The distance K4 is, for example, 100 mm or less. The distance K4 may be 70 mm or less or may be 50 mm or less. If the drift electrode 40 is brought into contact with the inner surface 212, the drift electrode 40 is electrically connected to the container 20. Accordingly, it is desirable to maintain the distance K4 at a certain value or greater or to place an insulator between the drift electrode 40 and the inner surface 212. The distance K4 is, for example, 10 mm or greater. The distance K4 may be 20 mm or greater, or may be 30 mm or greater.

Figure 25:
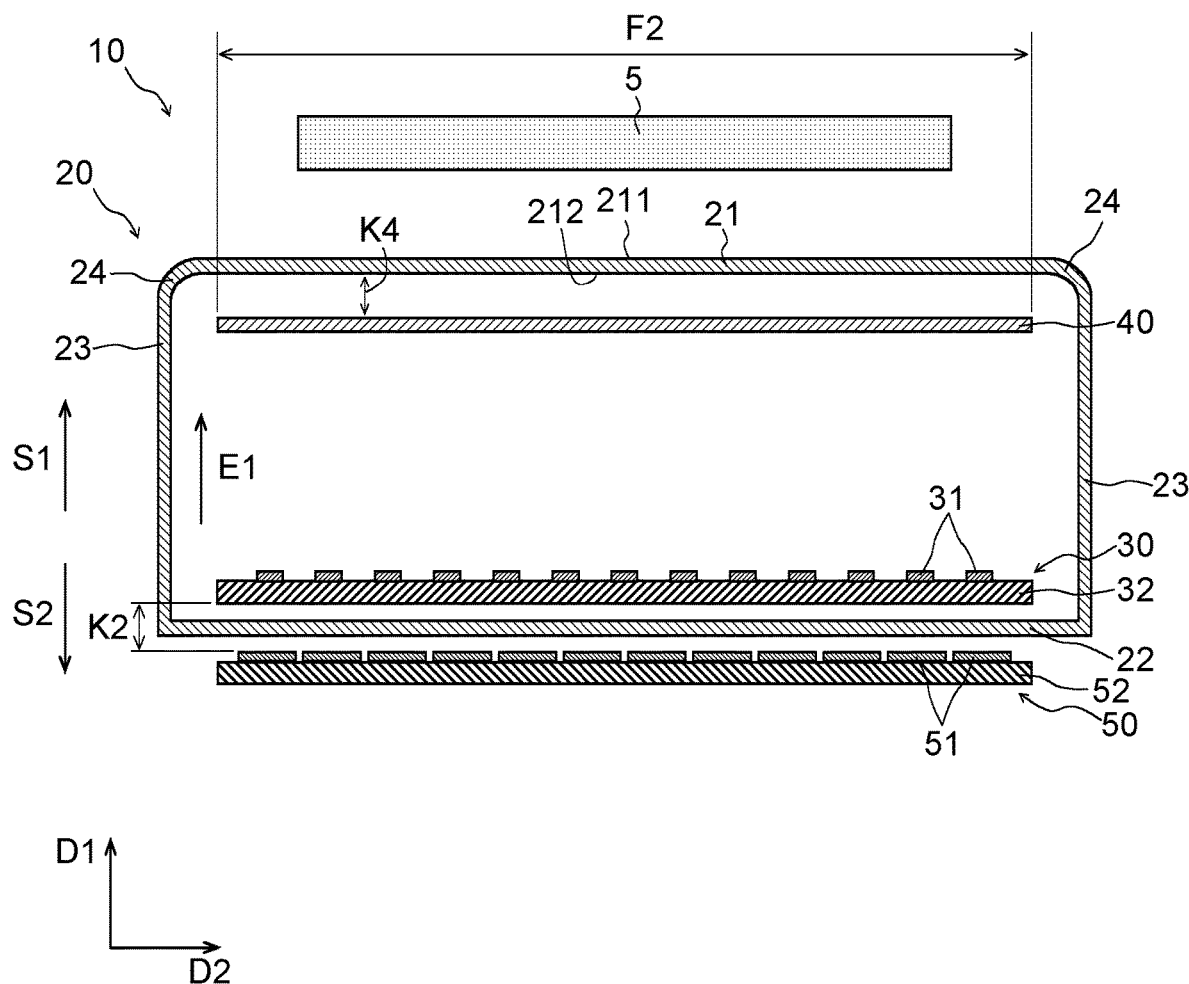
FIG. 25 is a sectional view of an example in which the container according to the first common modification is applied to the second embodiment.

FIG. 25 is a sectional view of another example in which the container 20 according to the first common modification is applied to the second embodiment. As illustrated in FIG. 25, the radiation detector 50 may be located outside the second portion 22. The radiation detector 50 may face the electron detector 30 with the second portion 22 interposed therebetween.

Figure 26:
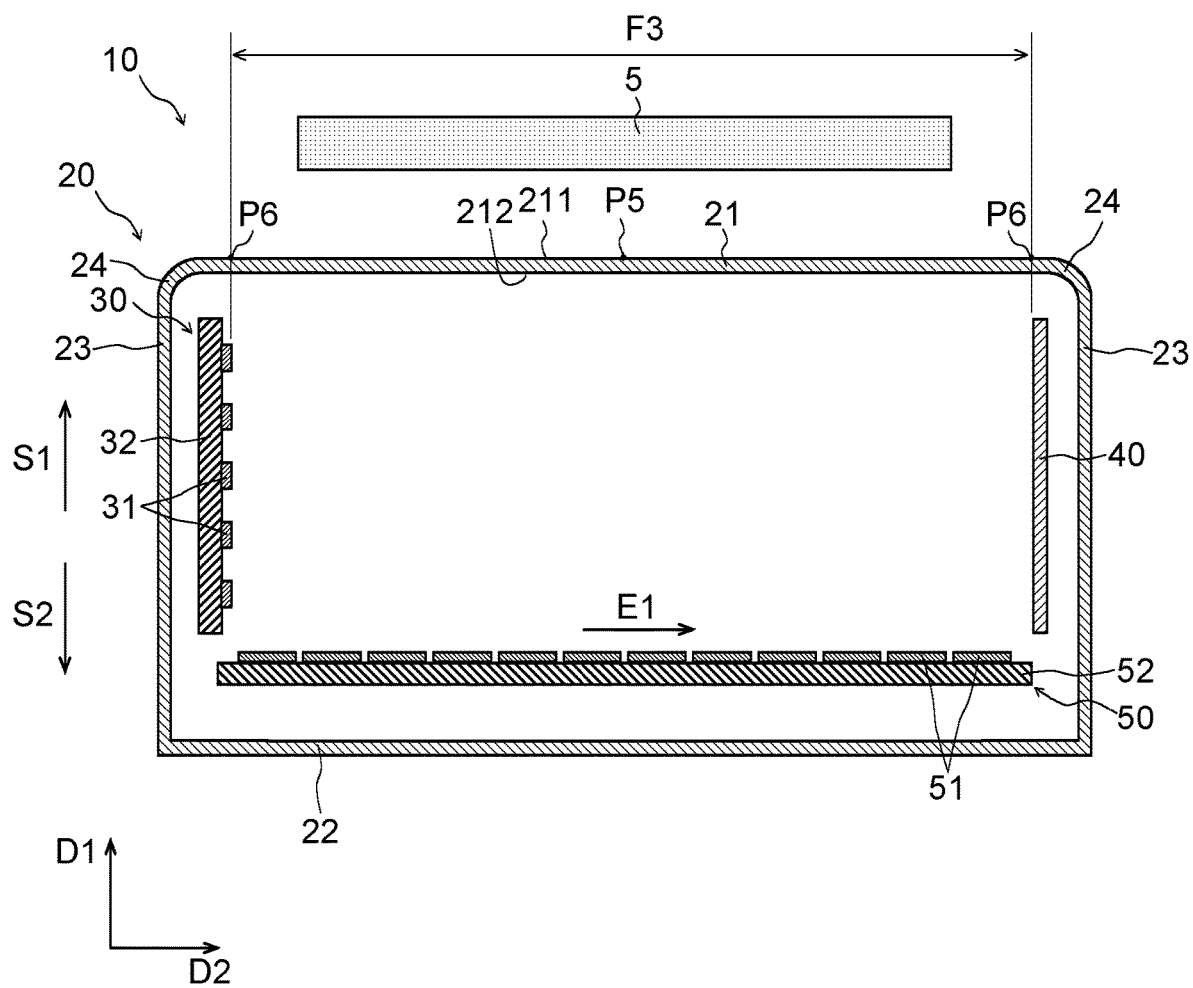
FIG. 26 is a sectional view of an example in which the container according to the first common modification is applied to the third embodiment.

FIG. 26 is a sectional view of an example in which the container 20 according to the first common modification is applied to the third embodiment. It is desirable that the outer surface 211 extend flatly over a range F3. For example, the difference between the position of a point P5 and the position of a point P6 in the surface direction of the side portion 23 is 10 mm or less. In this manner, the distance between the physical object 5 and the space between the electron detector 30 and the drift electrode 40 (hereinafter also referred to as "facing space") can be reduced. Consequently, the resolution of the measurement can be increased. The range F3 is a range that overlaps the facing space when viewed in the surface direction of the side portion 23. The point P5 on the outer surface 211 overlaps the center point of the facing space when viewed in the surface direction of the side portion 23. The point P6 on the outer surface 211 overlaps the surface of the electron detector 30 that faces the drift electrode 40 or the surface of the drift electrode 40 that faces the electron detector 30 when viewed in the surface direction of the side portion 23.

Figure 27:
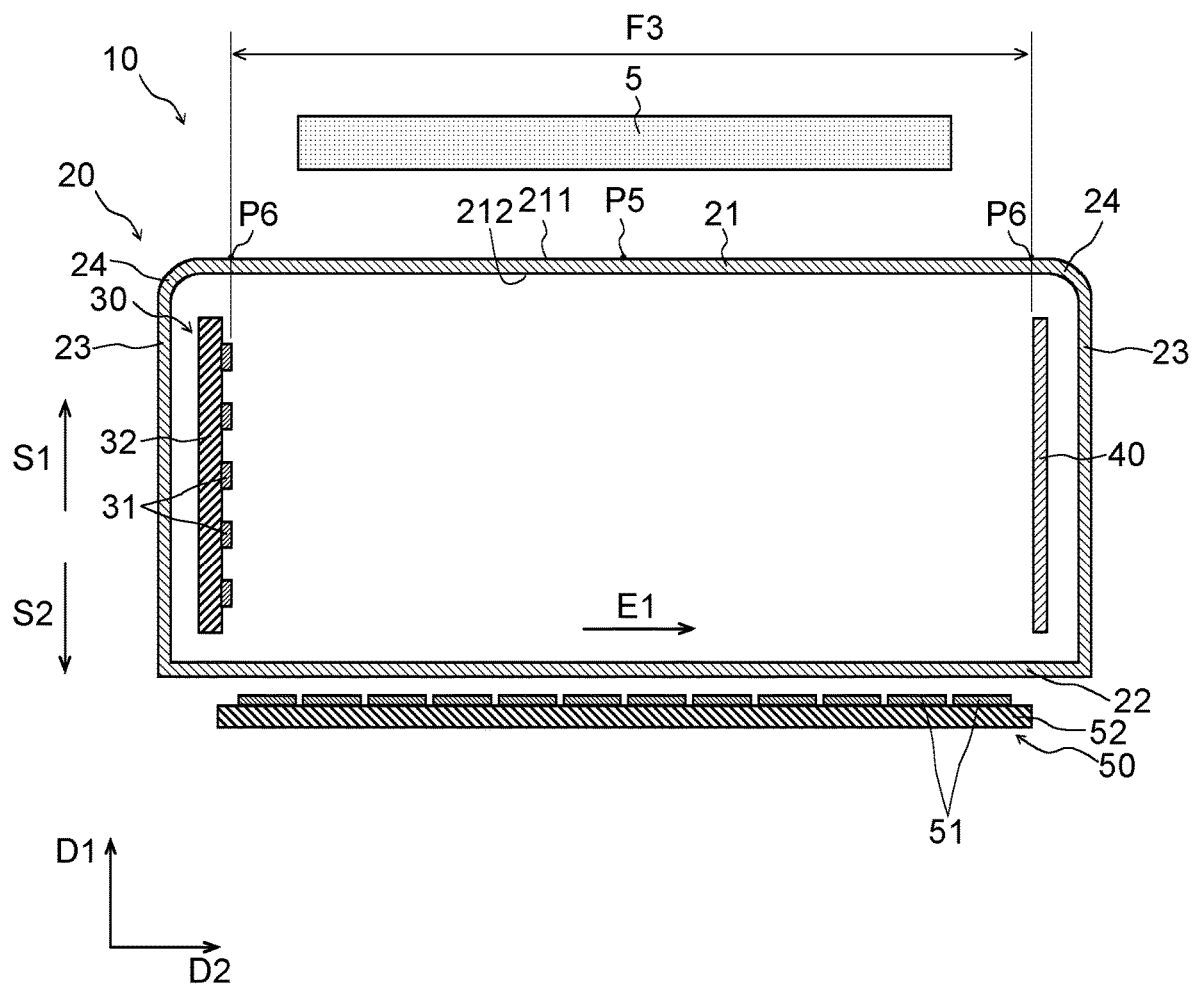
FIG. 27 is a sectional view of an example in which the container according to the first common modification is applied to the third embodiment.

FIG. 27 is a sectional view of another example in which the container 20 according to the first common modification is applied to the third embodiment. As illustrated in FIG. 27, the radiation detector 50 may be located outside the second portion 22. The radiation detector 50 may face the second portion 22.

(Second Common Modification)

Figure 28:
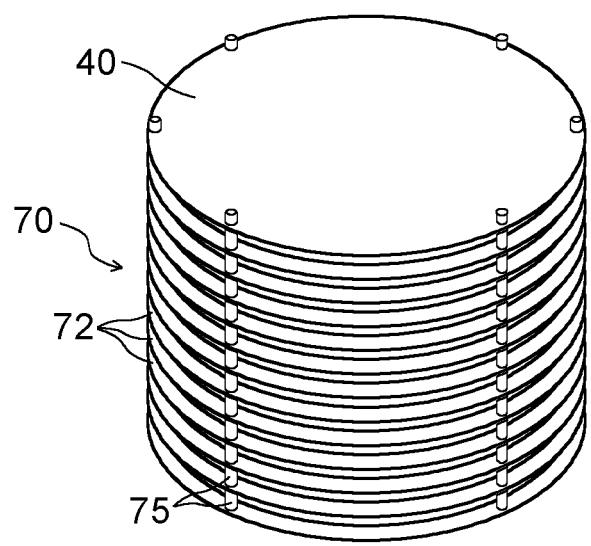
FIG. 28 is a perspective view of an auxiliary drift electrode according to a second common modification.
Figure 29:
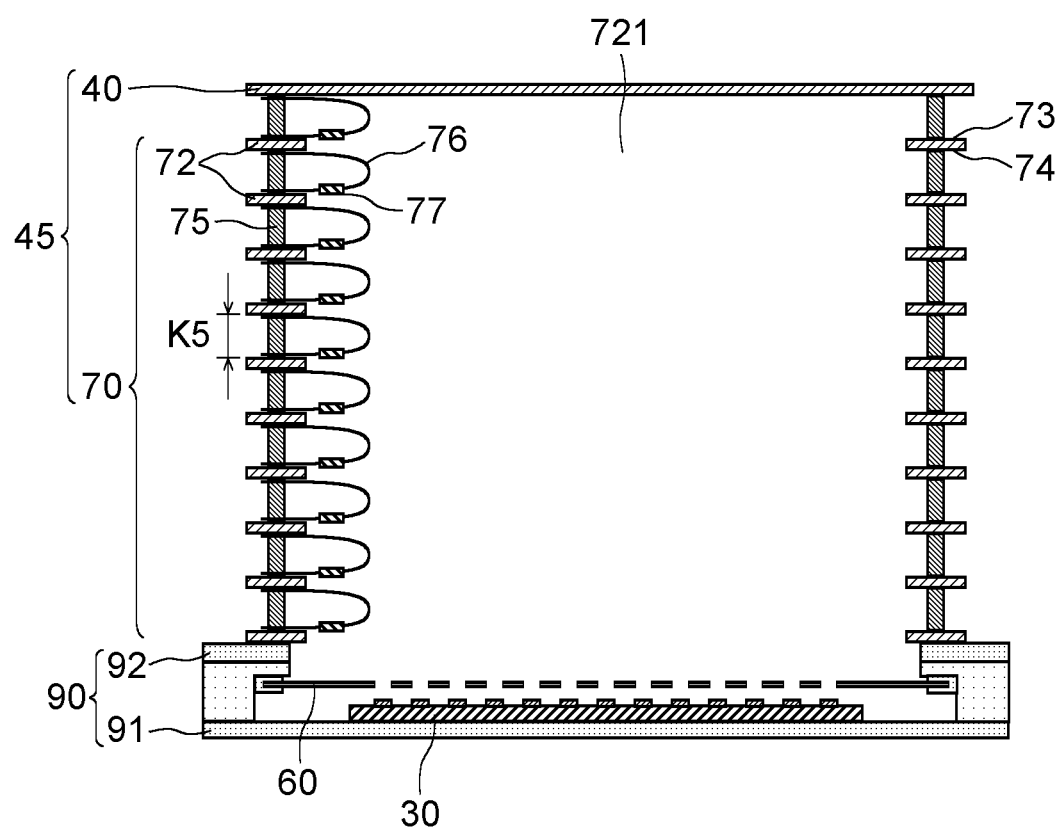
FIG. 29 is a sectional view of the auxiliary drift electrode according to the second common modification.

FIGS. 28 and 29 are a perspective view and a sectional view of an auxiliary drift electrode 70 according to the second common modification, respectively. The auxiliary drift electrode 70 may include a plurality of ring electrodes 72. The plurality of ring electrodes 72 are arranged in the facing direction. Each of the ring electrodes 72 includes a ring first surface 73 facing the drift electrode 40 and a ring second surface 74 opposite the ring first surface 73.

Figure 30:
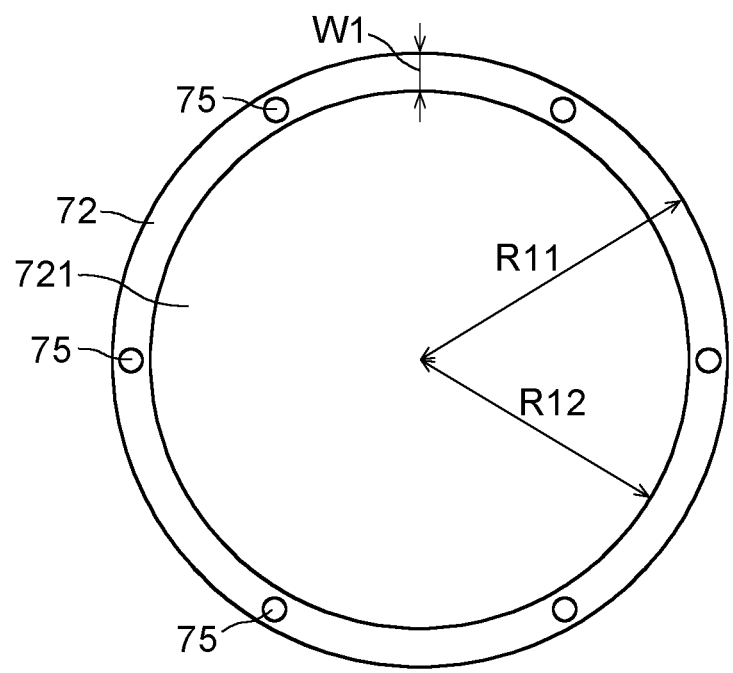
FIG. 30 is a plan view of an example of a ring electrode.

FIG. 30 is a plan view of the ring electrode 72. An opening 721 is formed in the ring electrode 72. The opening 721 overlaps the electron detector 30 in the facing direction. The ring electrode 72 need not overlap the electron detector 30 in the facing direction. The ring electrode 72 may overlap the drift electrode 40 in the facing direction. The ring electrode 72 has a width W1 in plan view. The width W1 is, for example, 5 mm or greater. The width W1 may be 6 mm or greater or may be 8 mm or greater. The width W1 is, for example, 30 mm or less. The width W1 may be 25 mm or less or may be 20 mm or less. The width W1 is the difference between a radius R11 of a circle that forms the outer periphery of the ring electrode 72 and a radius R12 of a circle that forms the inner periphery of the ring electrode 72.

The ring electrode 72 may be composed of a conductive wire. For example, a wire having a first end and a second end is provided first. Subsequently, the wire is deformed into a circle or polygon, and the first end and the second end are connected. The ring electrode 72 is thus obtained. In this case, the width W1 of the ring electrode 72 corresponds to the sectional dimension of the wire. For example, if the cross section of the wire is circular, the width W1 of the ring electrode 72 is equal to the diameter of the wire cross section. The material of the wire is, for example, metal.

The auxiliary drift electrode 70 may include spacers 75 disposed between two ring electrodes 72 that are adjacent in the facing direction. The spacers 75 define a distance K5 between the two ring electrodes 72 that are adjacent in the facing directions. The distance K5 is determined in accordance with the number of ring electrodes 72, the voltage between the electron detector 30 and the drift electrode 40, and the like. The distance K5 is, for example, 2 mm or greater. The distance K5 may be 5 mm or greater or may be 8 mm or greater. The distance K5 is, for example, 30 mm or less. The distance K5 may be 20 mm or less or may be 15 mm or less.

The drift electrode 40 may be attached to the auxiliary drift electrode 70. For example, the auxiliary drift electrode 70 may include the spacers 75 located between the drift electrode 40 and the ring electrode 72. The structure including the drift electrode 40 and the plurality of ring electrodes 72 is also referred to as a drift cage 45.

As illustrated in FIG. 29, the auxiliary drift electrode 70 may include a wiring line 76 that electrically connects two ring electrodes 72 that are adjacent in the facing direction. The auxiliary drift electrode 70 may include a wiring line 76 that electrically connects the drift electrode 40 to the ring electrode 72 that are adjacent in the facing direction. The auxiliary drift electrode 70 may include a resistor 77 inserted in the path of the wiring line 76. By electrically connecting two adjacent ring electrodes 72, the voltage between the two ring electrodes 72 can be adjusted. Thus, the potentials of the ring electrodes 72 arranged in the facing direction can be changed stepwise. For example, suppose that the potential of the drift electrode 40 is −4000 V, the potential of the electron detector 30 is 0 V, and 20 ring electrodes 72 are disposed between the drift electrode 40 and the electron detector 30. In this case, the potentials of the plurality of ring electrodes 72 arranged from the drift electrode 40 toward the electron detector 30 can be changed stepwise to −3800V, −3600V, −3400V . . . . Thus, the uniformity of the electric field formed in the space between the drift electrode 40 and the electron detector 30 can be improved.

The voltage between two ring electrodes 72 that are adjacent in the facing direction is, for example, 50 V or higher. The voltage may be 100 V or higher or may be 150 V or higher. The voltage between two ring electrodes 72 that are adjacent in the facing direction is, for example, 500 V or lower. The voltage may be 400 V or lower or may be 300 V or lower.

As illustrated in FIG. 29, the auxiliary drift electrode 70 may be supported by a relay board 90. The relay board 90 may support the electron detector 30. For example, the relay board 90 may include a first substrate 91 that supports the electron detector 30 and a second substrate 92 that supports the auxiliary drift electrode 70. The second substrate 92 may be located between the first substrate 91 and the auxiliary drift electrode 70. If the detection device 10 includes an electron amplifier 60, the electron amplifier 60 may also be supported by the relay board 90.

Figure 31:
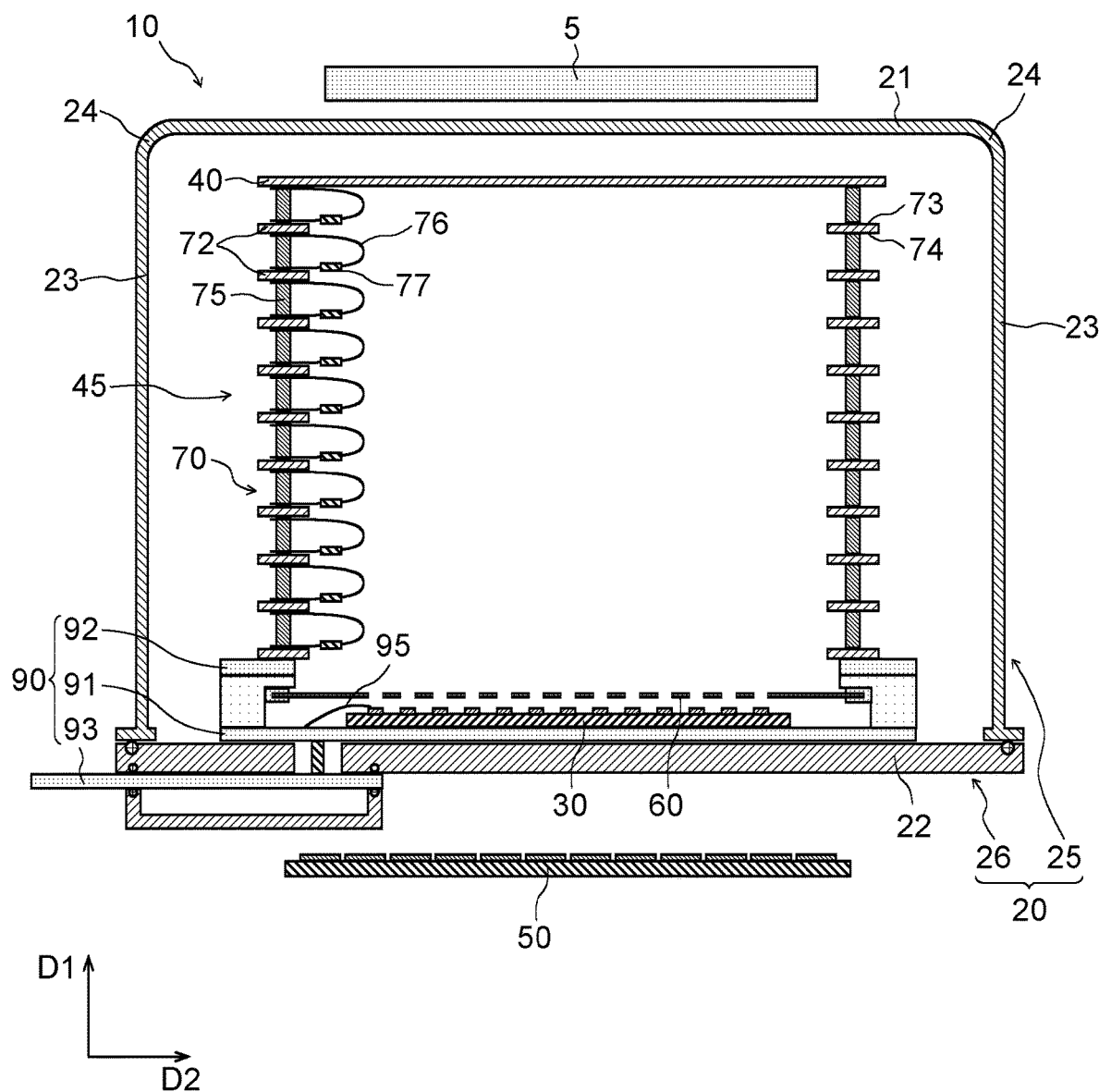
FIG. 31 is a sectional view of an example in which the auxiliary drift electrode according to the second common modification is applied to the second embodiment.

FIG. 31 is a sectional view of an example in which the auxiliary drift electrode 70 according to the second common modification is applied to the second embodiment. The radiation detector 50 may be located outside the container 20. In this case, the relay board 90 may be disposed on the second portion 22. By supporting the auxiliary drift electrode 70 using the relay board 90 on the second portion 22, the drift electrode 40 can face the first portion 21 without fixing the drift electrode 40 to the first portion 21.

As illustrated in FIG. 31, the relay board 90 may include a third substrate 93 extending from the inside to the outside of the container 20. The relay board 90 may include a wire 95 that electrically connect the electron detector 30 to the first substrate 91. An electrical signal from the electron detector 30 is transmitted to the outside of the container 20 via the wire 95, the first substrate 91, and the third substrate 93.

REFERENCE SIGNS LIST 5 physical object
10 detection device
20 container
21 first portion
22 second portion
23 side portion
24 corner
25 first portion
26 second portion
30 electron detector
31 collector electrode
32 support substrate
40 drift electrode 41 through-hole
45 drift cage
50 radiation detector
51 detection element
52 circuit board
60 electron amplifier
61 first electrode
62 second electrode
63 base material
64 through-hole
70 auxiliary drift electrode
72 ring electrode
73 ring first surface
74 ring second surface
75 spacer
76 wiring line
77 resistor
81 adsorbent
82 circulation path
83 pump
84 filter
90 relay board
91 first substrate
92 second substrate
93 third substrate
95 wire

The invention claimed is:

1. A detection device for detecting radiation, comprising:
a container including a first portion, a second portion facing the first portion in a first direction, and a side portion extending from the first portion toward the second portion, wherein a gas is contained in the container;
an electron detector located inside the container, wherein the electron detector detects an electron generated by Compton scattering;
a drift electrode located inside the container closer to the second portion than the electron detector and facing the electron detector; and
a radiation detector located closer to the second portion than the drift electrode, wherein the radiation detector detects scattered radiation, and
wherein the first portion includes an outer surface extending flatly in a range that overlaps the electron detector as viewed in a direction in which the electron detector faces the drift electrode.

2. The detection device according to claim 1, wherein the radiation detector is located inside the container.

3. The detection device according to claim 1, wherein the radiation detector is located outside the container.

4. The detection device according to claim 1, wherein a distance between an inner surface of the first portion and the electron detector is 10 mm or less.

5. The detection device according to claim 1, further comprising:
an electron amplifier located between the electron detector and the drift electrode and facing the electron detector and the drift electrode.

6. The detection device according to claim 5, wherein the electron detector includes a plurality of collector electrodes,
wherein the electron amplifier includes a base material having a front surface and a back surface and having a through-hole formed to overlap the collector electrode in a direction facing the drift electrode, a first electrode located on the front surface, and a second electrode located on the back surface.

7. The detection device according to claim 1, wherein the radiation detector includes a scintillator configured to be excited by the scattered radiation and emit fluorescence and a light detector configured to detect the fluorescence.

8. The detection device according to claim 1, wherein the radiation detector includes a semiconductor detection element configured to detect the scattered radiation.

9. The detection device according to claim 1, wherein the side portion of the container has a cylindrical shape.

10. The detection device according to claim 1, further comprising:
an adsorbent located inside the container.

11. The detection device according to claim 1, further comprising:
a circulation path connected to the container; and
a pump and a filter inserted into the circulation path.

12. A detection device for detecting radiation, comprising:
a container including a first portion, a second portion facing the first portion in a first direction, and a side portion extending from the first portion toward the second portion, wherein a gas is contained in the container;
an electron detector located inside the container, wherein the electron detector detects an electron generated by Compton scattering;
a drift electrode located inside the container closer to the first portion than the electron detector and facing the electron detector; and
a radiation detector located closer to the second portion than the electron detector, wherein the radiation detector detects scattered radiation, and
wherein the first portion includes an outer surface extending flatly in a range that overlaps the drift electrode as viewed in a direction in which the electron detector faces the drift electrode.

13. The detection device according to claim 12, wherein the radiation detector is located inside the container.

14. The detection device according to claim 12, wherein the radiation detector is located outside the container.

15. The detection device according to claim 14, further comprising:
an auxiliary drift electrode including a plurality of ring electrodes arranged in a direction in which the electron detector faces the drift electrode, and a spacer located between adjacent two of the ring electrodes; and
a relay board configured to support the auxiliary drift electrode and the electron detector,
wherein the drift electrode is attached to the auxiliary drift electrode and faces the electron detector, and
wherein the relay board is disposed on the second portion.

16. The detection device according to claim 12, wherein a distance between an inner surface of the first portion and the drift electrode is 10 mm or greater and 100 mm or less.

17. The detection device according to claim 1, wherein the drift electrode includes a plurality of through-holes.

18. A detection device for detecting radiation, comprising:
a container including a first portion, a second portion facing the first portion in a first direction, and a side portion extending from the first portion toward the second portion, wherein a gas is contained in the container;
an electron detector located inside the container, wherein the electron detector detects an electron generated by Compton scattering;
a drift electrode located inside the container closer to the second portion than the electron detector and facing the electron detector;

a radiation detector located closer to the second portion than the drift electrode, wherein the radiation detector detects scattered radiation; and an auxiliary drift electrode including a plurality of ring electrodes arranged in a direction in which the electron detector faces the drift electrode, and a spacer located between adjacent two of the ring electrodes.

* * * * *